(12) United States Patent
Stahl et al.

(10) Patent No.: US 9,074,039 B2
(45) Date of Patent: Jul. 7, 2015

(54) POLYURETHANE FOAM COMPOSITIONS AND PROCESS FOR MAKING SAME

(76) Inventors: John A. Stahl, Broadview Heights, OH (US); Jonathon S. Stahl, Rocky River, OH (US)

( * ) Notice: Subject to any disclaimer, the term of this patent is extended or adjusted under 35 U.S.C. 154(b) by 0 days.

(21) Appl. No.: 12/997,565

(22) PCT Filed: Sep. 14, 2009

(86) PCT No.: PCT/US2009/056801
§ 371 (c)(1),
(2), (4) Date: May 26, 2011

(87) PCT Pub. No.: WO2010/030975
PCT Pub. Date: Mar. 18, 2010

(65) Prior Publication Data
US 2012/0022176 A1  Jan. 26, 2012

Related U.S. Application Data

(60) Provisional application No. 60/192,081, filed on Sep. 15, 2008.

(51) Int. Cl.
*C08G 18/06* (2006.01)
*C08G 18/71* (2006.01)
*C08G 18/76* (2006.01)
*C08J 9/00* (2006.01)
*C08G 101/00* (2006.01)
*C08K 3/00* (2006.01)
*C08K 3/04* (2006.01)
*C08K 7/22* (2006.01)

(52) U.S. Cl.
CPC .......... *C08G 18/715* (2013.01); *C08G 18/7657* (2013.01); *C08G 18/7664* (2013.01); *C08G 2101/005* (2013.01); *C08G 2101/0058* (2013.01); *C08G 2150/60* (2013.01); *C08J 9/0066* (2013.01); *C08J 2375/04* (2013.01); *C08K 3/0058* (2013.01); *C08K 3/04* (2013.01); *C08K 7/22* (2013.01); *C08G 2101/00* (2013.01)

(58) Field of Classification Search
CPC ............. C08G 18/715; C08G 18/7657; C08G 18/7664; C08G 2101/00; C08G 2101/005; C08G 2101/0058; C08G 2150/60; C08J 2375/04; C08J 9/0066; C08K 3/0058; C08K 3/04; C08K 7/22
USPC ........... 521/99, 103, 106, 107, 123, 128, 170, 521/10, 6
See application file for complete search history.

(56) References Cited

U.S. PATENT DOCUMENTS

| | | | | |
|---|---|---|---|---|
| 4,237,238 A | * | 12/1980 | DeGuiseppi et al. | 521/131 |
| 4,514,524 A | * | 4/1985 | Fesman | 521/107 |
| 4,526,906 A | * | 7/1985 | Wegner | 521/107 |
| 5,660,926 A | * | 8/1997 | Skowronski et al. | 428/314.4 |
| 5,739,173 A | * | 4/1998 | Lutter et al. | 521/99 |
| 2002/0020827 A1 | | 2/2002 | Munzenberger et al. | |
| 2004/0122119 A1 | | 6/2004 | Burgess et al. | |
| 2006/0174798 A1 | | 8/2006 | Churchill | |
| 2006/0191232 A1 | | 8/2006 | Salazar et al. | |
| 2006/0211784 A1 | | 9/2006 | Veneruso | |
| 2008/0051481 A1 | | 2/2008 | Krupa et al. | |

OTHER PUBLICATIONS

Extended European Search Report and Opinion Dated Jan. 27, 2012 for European Patent Application No. 09813739.1.
PCT Search Report for PCT/US2009/056801 dated Nov. 24, 2009.
Canadian Office Action for Canadian Patent Application No. 2,737,162 dated Apr. 10, 2013.

* cited by examiner

*Primary Examiner* — John Cooney
(74) *Attorney, Agent, or Firm* — Joseph J. Crimaldi; McDonald Hopkins LLC

(57) ABSTRACT

The present invention generally relates to polyurethane foam composition. In one embodiment, the present invention relates to polyurethane foam compositions that have increased and/or improved fire-retardant properties due to the inclusion of one or more liquid and/or solid fire-retardants. In another embodiment, the present invention relates to polyurethane foam compositions that have increased and/or improved fire-retardant properties due to the inclusion of one or more intumescent materials (e.g., expandable graphite (EG)). In still another embodiment, the present invention relates to polyurethane foam compositions that have increased and/or improved fire-retardant properties due to the inclusion of expandable graphite.

41 Claims, 1 Drawing Sheet

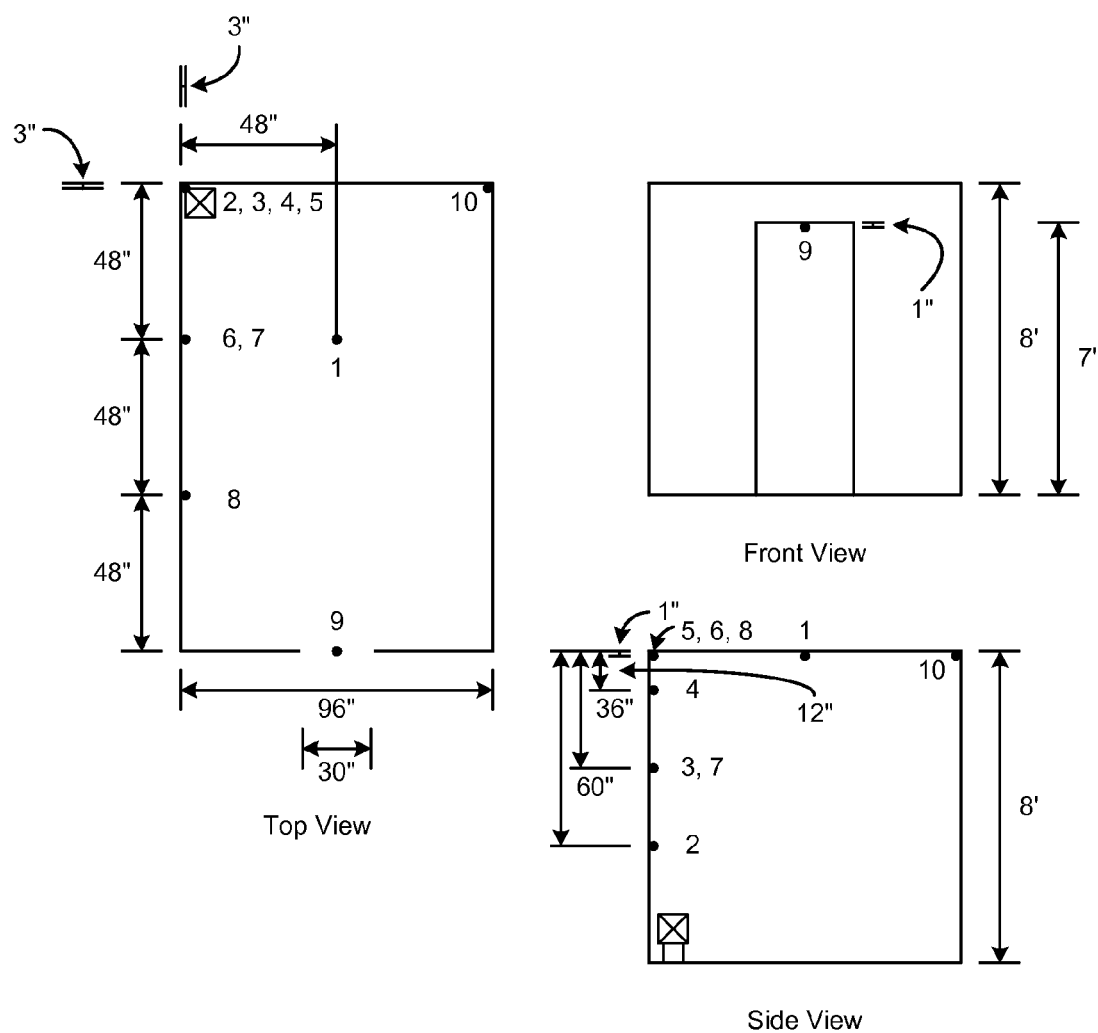

POLYURETHANE FOAM COMPOSITIONS AND PROCESS FOR MAKING SAME

RELATED APPLICATION DATA

This patent application claims priority to and is a 35 U.S.C. §371application of PCT/US2009/056801, filed Sept.14, 2009, and entitled "Polyurethane Foam Compositions and Process for Making Same," which claims priority to U.S. Provisional Patent Application No. 61/192,081, filed Sept. 15, 2008, and entitled "Polyurethane Foam Compositions and Process for Making Same," the disclosures of which are incorporated by reference in its entirety.

FIELD OF THE INVENTION

The present invention generally relates to polyurethane foam composition. In one embodiment, the present invention relates to polyurethane foam compositions that have increased and/or improved fire-retardant properties due to the inclusion of one or more liquid and/or solid fire-retardants. In another embodiment, the present invention relates to polyurethane foam compositions that have increased and/or improved fire-retardant properties due to the inclusion of one or more intumescent materials (e.g., expandable graphite (EG)). In still another embodiment, the present invention relates to polyurethane foam compositions that have increased and/or improved fire-retardant properties due to the inclusion of expandable graphite.

BACKGROUND OF THE INVENTION

The physical and mechanical properties of polyurethane foams make them useful for a wide variety of applications, including thermal and sound insulation, upholstery and bedding. However, many foams, including polyurethane foams, are inherently flammable and lead to the melting and spread of burning debris. In the case of such "conventional" foams this can lead to sustaining combustion by progressive smoldering even after the actual flames have extinguished.

It is considered that cellular materials manufactured from flammable polymers are more flammable than the solid materials because the insulating effect of their cellular nature allows a rapid build-up of heat at the heated surface with a consequence high rate of pyrolysis. In solid materials this heat build-up is at a lower rate because of the higher conductivity of the solid material. Although rigid foams have similar thermal conductivity behavior as flexible foams, the high crosslinked nature of their chemical structure makes them less flammable as polymers and also inherently more inclined to form a protective char rather than to form the flaming molten polymer droplets which occur with flexible foams. While both solid and rigid cellular materials burn less easily than flexible foams and are easier to extinguish, they all tend to smolder and emit toxic fumes.

Accordingly, in light of the above, certain applications to date have remained a difficult challenge for the application of polymer foams. One such area is foam insulation for building applications. Due to the fact that all foam building products are required to meet specific fire performance standards required by U.S. building codes, it has not been possible for polymer foam insulation without thick fire-resistant protective surfaces, such as one-half inch gypsum board, applied over the foam insulation to meet such codes.

As such, there is a need in the art for polyurethane foam insulation products that are designed to meet one or more U.S. building codes when utilized as a stand-alone product, or even when covered with a thin coating or surface finishing product, in order to lower the installed costs of such products.

SUMMARY OF THE INVENTION

The present invention generally relates to polyurethane foam composition. In one embodiment, the present invention relates to polyurethane foam compositions that have increased and/or improved fire-retardant properties due to the inclusion of one or more liquid and/or solid fire-retardants. In another embodiment, the present invention relates to polyurethane foam compositions that have increased and/or improved fire-retardant properties due to the inclusion of one or more intumescent materials (e.g., expandable graphite (EG)). In still another embodiment, the present invention relates to polyurethane foam compositions that have increased and/or improved fire-retardant properties due to the inclusion of expandable graphite.

In one embodiment, the present invention relates to a polyurethane foam formed from a combination comprising: (a) at least one isocyanate component, wherein the at least one isocyanate component comprises: (i) at least one intumescent compound; and (ii) at least one isocyanate compound, and (b) at least one polyol component, wherein the at least one polyol component comprises: (i) at least one intumescent compound; and (ii) at least one polyol compound.

In another embodiment, the present invention relates to a polyurethane foam formed from a combination comprising: (A) at least one isocyanate component, wherein the at least one isocyanate component comprises at least one isocyanate compound; and (B) at least one polyol component, wherein the at least one polyol component comprises at least one polyol compound, wherein at least one of component (A) or (B) further comprises at least one intumescent compound.

In still another embodiment, the present invention relates to a polyurethane foam comprising: (I) from about 1 percent by weight to about 50 percent by weight of one or more intumescent compounds based on the total amount of polyurethane present; (II) from about 0.001 percent by weight to about 10 percent by weight of one or more viscosity modifiers based on the total amount of polyurethane present; (III) from about 0.01 percent by weight to about 20 percent by weight of one or more thixotropic agents based on the total amount of polyurethane present; and (IV) from about 1 percent by weight to about 25 percent by weight of one or more colorants and/or pigments based on the total amount of polyurethane present.

In still yet another embodiment, the present invention relates to a method for producing a polyurethane foam, the method comprising the steps of: providing at least one isocyanate component, wherein the at least one isocyanate component comprises at least one isocyanate compound; providing at least one polyol component, wherein the at least one polyol component comprises at least one polyol compound; and mixing the at least one isocyanate component with the at least one polyol component to produce a polyurethane foam, wherein at least one of, or both of, the at least one isocyanate component and the at least one polyol component further comprise at least one intumescent compound.

In still yet another embodiment, the present invention relates to a polyurethane foam having at least one fire-retardant compound therein that is designed to meet any one or more of the fire test standards required by one or more building codes disclosed and described herein, and to a process for making same as disclosed and described herein.

BRIEF DESCRIPTION OF THE DRAWINGS

FIG. 1 is an illustration of the test room and thermocouple locations that are used to conduct various Test Method UL-1715 runs.

DETAILED DESCRIPTION OF THE INVENTION

The present invention generally relates to polyurethane foam composition. In one embodiment, the present invention relates to polyurethane foam compositions that have increased and/or improved fire-retardant properties due to the inclusion of one or more liquid and/or solid fire-retardants. In another embodiment, the present invention relates to polyurethane foam compositions that have increased and/or improved fire-retardant properties due to the inclusion of one or more intumescent materials (e.g., expandable graphite (EG)). In still another embodiment, the present invention relates to polyurethane foam compositions that have increased and/or improved fire-retardant properties due to the inclusion of expandable graphite.

Polyurethane Foam:

In one embodiment, the polyurethane foam of the present invention is formed from any suitable combination of one or more polymeric polyols and one or more organic polyisocyanates. The combination of one or more polyols and one or more organic polyisocyanates used to produce the polyurethane foam of the present invention is not critical so long as the foam produced is, in one embodiment, flexible in nature. Given this, the present invention is not limited to one or more specific polyols in combination with one or more specific organic polyisocyanates. Rather, the polyurethane foams of the present invention can be prepared from a wide range of starting components as is known to those of skill in the art.

In still another embodiment, the polyurethane foams of the present invention are rigid or semi-rigid in nature. Again, the combination of one or more polyols and one or more organic polyisocyanates used to produce the polyurethane foam of the present invention is not critical so long as the foam produced is rigid or semi-rigid in nature. Given this, the present invention is not limited to one or more specific polyols in combination with one or more specific organic polyisocyanates. Rather, the polyurethane foams of the present invention can be prepared from a wide range of starting components as is known to those of skill in the art. The term semi-rigid as applied to foams is a standard term used in the art. Generally such foams have a glass transition temperature ($T_g$) between rigid and flexible foams.

In one embodiment, the polyurethane foams of the present invention, whether flexible or rigid, are designed to be sprayable, pourable and/or injectible and have densities in the range of about 0.25 pounds per cubic foot to about 6 pounds per cubic foot ($ft^3$). In another embodiment, the polyurethane foams of the present invention have densities from about 0.5 pounds per cubic foot to about 5 pounds per cubic foot, or from about 0.75 pound per cubic foot to about 4 pounds per cubic foot, or from about 1 pound per cubic foot to about 3 pounds per cubic foot, or even from about 1.25 pounds per cubic foot to about 2.5 pounds per cubic foot. Here, as well as elsewhere in the specification and claims, individual range limits can be combined to form additional and/or non-disclosed ranges.

In one embodiment, the polyurethane foams of the present invention are primarily open-cell foams when the foams have densities of less than 1 pound per cubic foot. In another embodiment, the polyurethane foams of the present invention are primarily closed-cell foams when the foams have densities of greater than 1 pound per cubic foot. Open-celled foam means that 50 percent or more of the cells in the foam have an open structure.

In one embodiment, polyisocyanates useful in making polyurethanes include, but are not limited to, aliphatic, cycloaliphatic, and aromatic polyisocyanates, or combinations thereof having an average of from about 2 to about 3.5, and in one instance from about 2 to about 3.2, isocyanate groups per molecule. A crude polyisocyanate may also be used in the practice of the present invention, such as crude toluene diisocyanate obtained by the phosgenation of a mixture of toluene diamine or the crude diphenylmethane diisocyanate obtained by the phosgenation of crude methylene diphenylamine. Examples of suitable polyisocyanates are aromatic polyisocyanates such as those disclosed in U.S. Pat. No. 3,215,652, which is incorporated herein by reference for its teachings relating to the aromatic polyisocyanates disclosed therein.

In one embodiment, polyisocyanates for use in the present inventions include, but are not limited to, polymethylene polyphenylene polyisocyanates (MDI). As used herein MDI refers to polyisocyanates selected from diphenylmethane diisocyanate isomers, polyphenyl polymethylene polyisocyanates and derivatives thereof bearing at least two isocyanate groups. In addition to the isocyanate groups, such compounds may also contain carbodiimide groups, uretonimine groups, isocyanurate groups, urethane groups, allophanate groups, urea groups or biuret groups. MDI is obtainable by condensing aniline with formaldehyde, followed by phosgenation, which process yields what is called crude MDI. By fractionation of crude MDI, polymeric and pure MDI can be obtained. The crude, polymeric or pure MDI can be reacted with polyols or polyamines to yield modified MDI. In one embodiment, the MDI has an average of from about 2 to about 3.5, and in one instance from about 2 to about 3.2, isocyanate groups per molecule.

The total amount of polyisocyanate used to prepare the polyurethane foam should be sufficient to provide an isocyanate reaction index of typically from about 25 to about 300. In one embodiment, the index is greater than about 30, or even greater than about 35. In another embodiment, the index is no greater than about 100, or no greater than about 90, or even no greater than about 80. Here, as well as elsewhere in the specification and claims, individual numerical values can be combined to form additional and/or non-disclosed ranges. An isocyanate reaction index of 100 corresponds to one isocyanate group per isocyanate reactive hydrogen atom present from the water and the polyol composition.

Polyols which are useful in the preparation of the polyurethane foams of the present invention include those materials having two or more groups containing an active hydrogen atom capable of undergoing reaction with an isocyanate. In one embodiment, such compounds are materials having at least two hydroxyl, primary or secondary amine, carboxylic acid, or thiol groups per molecule. Compounds having at least two hydroxyl groups per molecule are attractive due to their desirable reactivity with polyisocyanates.

In one embodiment, polyols suitable for preparing rigid polyurethanes include, but are not limited to, those having an average molecular weight of about 100 to about 10,000, or even from about 200 to about 7,000. Here, as well as elsewhere in the specification and claims, individual range limits can be combined to form additional and/or non-disclosed ranges. Such polyols can also have a functionality of at least 2, or even 3, and up to 8 active hydrogen atoms per molecule. For the production of semi-rigid foams, a tri-functional polyol with a hydroxyl number of about 30 to about 300 can be utilized. Representative polyols include, but are not limited to, polyether polyols, polyester polyols, polyhydroxy-terminated acetal resins, hydroxyl-terminated amines and polyamines. Examples of these and other suitable isocyanate-reactive materials are described in U.S. Pat. No. 4,394,491, which is incorporated by reference herein for its teachings relating to isocyanate-reactive materials disclosed therein. In one embodiment, the polyols of the present invention are prepared by adding an alkylene oxide, such as ethylene oxide, propylene oxide, butylene oxide or a combination thereof, to an initiator having from 2 to 8, preferably 3 to 6 active hydrogen atoms.

In one embodiment, to achieve a semi-rigid polyurethane foam the polyol is a mixture of polyether or polyester polyols used to prepare "flexible" foams and polyols used to prepare "rigid" foams. The flexible polyols generally have a hydroxyl number of about 25 to about 75 and a functionality of about 2 to about 3. The polyols used for rigid foams generally have a hydroxyl number of about 150 to about 800 and a functionality of about 2 to about 8.

The polyurethane foam reaction mixture of the present invention also includes at least one blowing agent. In one embodiment any suitable blowing agent can be utilized. Exemplary blowing agents include, but are not limited to, water, melamine, melamine derivatives, alumina trihydrate, dicyandiamide, urea, or mixtures of two or more thereof. In one embodiment, the blowing agent can further provide additional fire-retardant properties to the polyurethane foams of the present invention. In one embodiment, the blowing agent is water. The water reacts with isocyanate in the reaction mixture to form carbon dioxide gas, thus blowing the foam formulation. The amount of water added is generally in the range of about 5 to about 25 percent by weight based on the amount of polyol present. In another embodiment, the water is added in the range of about 10 to about 20 percent by weight, or even from about 14 to about 18 percent by weight based on the amount of polyol present. Here, as well as elsewhere in the specification and claims, individual range limits can be combined to form additional and/or non-disclosed ranges.

In still another embodiment, a volatile liquid such as a halogenated hydrocarbon or a low-boiling hydrocarbon (boiling point of −10° C. to 70° C. at normal pressure), such as pentane and/or isomers thereof or isobutane and/or isomers thereof can be used as a supplemental blowing agent. In yet another embodiment, a halocarbon can be used as a supplemental blowing agent. Halocarbons include fully and partially halogenated aliphatic hydrocarbons such as fluorocarbons, chlorocarbons, and chlorofluorocarbons. Examples of fluorocarbons include, but are not limited to, methyl fluoride, perfluoromethane, ethyl fluoride, 1,1-difluoroethane, 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane and perfluorocyclobutane.

Partially halogenated chlorocarbons and chlorofluorocarbons for use in this invention include, but are not limited to, methyl chloride, methylene chloride, ethyl chloride, 1,1,1-trichloroethane, 1,1-dichloro-1-fluoroethane (FCFC-141b), 1-chloro-1,1-difluoroethane (HCFC-142b), 1,1-dichloro-2,2,2-trifluoroethane (HCHC-123) and 1-chloro-1,2,2,2-tetrafluoroethane (HCFC-124).

Fully halogenated chlorofluorocarbons include, but are not limited to, trichloromonofluoromethane (CFC-11) dichlorodifluoromethane (CFC-12), trichlorotrifluoromethane (CFC-113), 1,1,1-trifluoroethane, pentafluoroethane, dichlorotetrafluoroethane (CFC-114), chloroheptafluoropropane and dichlorohexafluoropropane.

In addition to the foregoing components, it is often desirable to employ certain other ingredients in preparing cellular polymers. Among these additional ingredients are catalysts, surfactants, preservatives, colorants, antioxidants, reinforcing agents, stabilizers and fillers. Optionally, in one embodiment a minor amount of a surfactant is utilized to stabilize the foaming reaction mixture until it cures. Such surfactants can comprise a liquid or solid organosilicone surfactant. Other surfactants include, but are not limited to, polyethylene glycol ethers of long-chain alcohols, tertiary amine or alkanolamine salts of long-chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. In one embodiment, about 0.2 to about 5 parts of the surfactant per 100 parts by weight polyol are sufficient for this purpose.

Optionally, one or more catalysts for the reaction of the polyol (and water, if present) with the polyisocyanate can be used. Any suitable urethane catalyst can be used, including tertiary amine compounds and organometallic compounds. Exemplary tertiary amine compounds include, but are not limited to, triethylenediamine, N-methylmorpholine, N,N-dimethylcyclohexylamine, pentamethyldiethylenetriamine, tetramethylethylenediamine, 1-methyl-4-dimethylaminoethylpiperazine, 3-methoxy-N-dimethylpropylamine, N-ethylmorpholine, diethylethanolamine, N-cocomorpholine, N,N-dimethyl-N',N'-dimethyl isopropylpropylenediamine, N,N-diethyl-3-diethylamino-propylamine and dimethylbenzylamine. Exemplary organometallic catalysts include, but are not limited to, organomercury, organolead, organoferric and organotin catalysts. Suitable tin catalysts include, but are not limited to, stannous chloride, tin salts of carboxylic acids such as dibutyltin di-2-ethyl hexanoate, as well as other organometallic compounds such as are disclosed in U.S. Pat. No. 2,846,408. A catalyst for the trimerization of polyisocyanates, resulting in a polyisocyanurate, such as an alkali metal alkoxide can also optionally be employed herein. Such catalysts are used in an amount which measurably increases the rate of polyurethane or polyisocyanurate formation. Typical amounts are about 0.001 to about 2 parts of catalyst per 100 parts by weight of polyol.

Intumescent Compound:

In one embodiment, the present invention contains at least one intumescent compound. As used herein, an intumescent compound is one which swells and/or chars when exposed to a heat source (e.g., a flame). Suitable intumescent compounds for use in the present invention include, but are not limited to, polymer intumescent compounds, elastomeric intumescent compounds, mixed intumescent materials (e.g., those disclosed in U.S. Pat. No. 6,706,793 which discloses a mixed intumescent formed from a halogenated polymer, antimony oxide; and an intercalated graphite), graphite, expandable graphite, treated expandable graphite (e.g., encapsulated with sulfuric acid), or a combination of any two or more thereof.

In one embodiment, the amount of the one or more intumescent compounds present in the final polyurethane foam of the present invention is in the range of about 1 percent by weight to about 50 percent by weight based on the total weight of the foam and/or the foam-forming components. In another embodiment, the amount of the one or more intumescent compound present in the final polyurethane foam of the present invention is from about 2.5 percent by weight to about 45 percent by weight based on the total weight of the foam and/or the foam-forming components, or from about 5 percent by weight to about 40 percent by weight based on the total weight of the foam and/or the foam-forming components, or from about 7.5 percent by weight to about 35 percent by weight based on the total weight of the foam and/or the foam-forming components, or from about 10 percent by weight to about 30 percent by weight based on the total weight of the foam and/or the foam-forming components, or from about from about 12.5 percent by weight to about 25 percent by weight based on the total weight of the foam and/or the foam-forming components, or even from about from about 15 percent by weight to about 22.5 percent by weight based on the total weight of the foam and/or the foam-forming components. Here, as well as elsewhere in the specification and claims, individual range limits can be combined to form additional and/or non-disclosed ranges.

In another embodiment, the amount of the one or more intumescent compounds that are used in conjunction with the polyurethanes of the present invention can be varied in response to the performance criteria (e.g., the ability to pass one or more U.S. building code and/or sanctioned fire tests) that are desired to be achieved in the final polyurethane foam product.

Regarding the one or more intumescent compounds contained in the polyurethane foams of the present invention, the one or more intumescent compounds can be added to either one or both of: (i) the one or more polymeric polyols; and/or (ii) the one or more organic polyisocyanates, that are used to form the polyurethane compounds of the present invention.

In some embodiments, the present invention utilizes a lower amount of one or more intumescent compounds in order to achieve the desired ASTM E-84, UL-723 and/or NFPA 255 flame spread and/or smoke ratings. In one embodiment the present invention utilizes a suitable amount of one or more intumescent compounds, within the ranges set forth above, to achieve an ASTM E-84, UL-723 and/or NFPA 255 flame spread rating of less than about 25, or less than about 20, or less than about 15, or even less than about 10. In another embodiment the present invention utilizes a suitable amount of one or more intumescent compounds, within the ranges set forth above, to achieve an ASTM E-84, UL-723 and/or NFPA 255 smoke rating of less than about 450, less than about 400, less than about 350, less than about 300, less than about 250, less than about 200, less than about 150, less than about 100, or even less than about 50. Here, as well as elsewhere in the specification and claims, individual range limits can be combined to form additional and/or non-disclosed ranges.

In another embodiment, the polyurethane foams of the present invention contain only one or more intumescent compounds in such amounts as to impart improved fire-retardant properties to the foam. In other words, in this embodiment the polyurethane foams of the present invention are substantially free from non-intumescent fire-retardants. By "substantially free" it is meant that the polyurethane foams of the present invention contain less than about 7.5 percent by weight based on the total weight of the foam and/or the foam-forming components, less than about 5 percent by weight based on the total weight of the foam and/or the foam-forming components, less than about 2.5 percent by weight based on the total weight of the foam and/or the foam-forming components, less than about 1 percent by weight based on the total weight of the foam and/or the foam-forming components, less than about 0.5 percent by weight based on the total weight of the foam and/or the foam-forming components, less than about 0.1 percent by weight based on the total weight of the foam and/or the foam-forming components, or even no amount (i.e., zero percent by weight based on the total weight of the foam and/or the foam-forming components) of one or more non-intumescent fire-retardants apart from the one or more intumescent compounds discussed above. Here, as well as elsewhere in the specification and claims, individual numerical values can be combined to form additional and/or non-disclosed ranges.

Non-Intumescent Fire-Retardants:

In one embodiment, the polyurethane foams of the present invention contain any suitable amount of one or more non-intumescent fire-retardant compounds. Such non-intumescent fire-retardants are known in the art and include, but are not limited to, halogen and/or phosphorous-containing fire-retardant compounds, antimony oxides, boron-containing fire-retardant compounds, hydrated aluminas, polyammonium phosphates, halogenated fire-retardant compounds, melamine-based fire retardants or a mixture of any two or more thereof. Exemplary halogenated fire-retardant compounds include, but are not limited to, chlorinated paraffin, decabromodipheyloxide, available from the Albermarle Corporation under the trade name SAYTE® 102E, and ethylene bis-tetrabromophthalimide, also available from the Albermarle Corporation under the trade name SAYTEX® BT-93.

In one embodiment, the polyurethane foam compositions of the present invention contain from about 5 percent by weight to about 30 percent by weight of one or more non-intumescent fire-retardants based on the total weight of the foam and/or the foam-forming components, or from about 7.5 percent by weight to about 27.5 percent by weight of one or more non-intumescent fire-retardants based on the total weight of the foam and/or the foam-forming components, from about 10 percent by weight to about 25 percent by weight of one or more non-intumescent fire-retardants based on the total weight of the foam and/or the foam-forming components, from about 12.5 percent by weight to about 22.5 percent by weight of one or more non-intumescent fire-retardants based on the total weight of the foam and/or the foam-forming components, from about 15 percent by weight to about 20 percent by weight of one or more non-intumescent fire-retardants based on the total weight of the foam and/or the foam-forming components, or even about 17.5 percent by weight of one or more non-intumescent fire-retardants based on the total weight of the foam and/or the foam-forming components. Here, as well as elsewhere in the specification and claims, individual numerical values can be combined to form additional and/or non-disclosed ranges.

Other Additives:

In another embodiment, the polyurethane foams of the present invention can contain various other compounds including, but not limited to, colorants, anti-settling compounds (e.g., thixotropic agents), viscosity modifiers, pigments (e.g., $TiO_2$), or mixtures of any two or more thereof. It should be noted that the polyurethane foams of the present invention, or the components used to form such foams, can also include a wide variety of conventional additives. Such conventional additives include, but are not limited to, one or more catalysts, one or more blowing agents, one or more surfactants, etc. Since polyurethane foams are known to those of skill in the art, a discussion of how to make such foams and/or their additional convention components and additives is omitted for the sake of brevity.

In one embodiment, the foams of the present invention contain any suitable amount of such one or more additional additives so long as the foams have a density in the ranges discussed above. In one embodiment, such one or more additional additives are present, individually or in combination, in an amount in the range of 0 percent by weight to about 10 percent by weight based on the total weight of the foam and/or the foam-forming components, from about 0.001 percent by weight to about 7.5 percent by weight based on the total weight of the foam and/or the foam-forming components, from about 0.01 percent by weight to about 5 percent by weight based on the total weight of the foam and/or the foam-forming components, from about 0.1 percent by weight to about 2.5 percent by weight based on the total weight of the foam and/or the foam-forming components, from about 1 percent by weight to about 1.5 percent by weight based on the total weight of the foam and/or the foam-forming components. Here, as well as elsewhere in the specification and claims, individual range limits can be combined to form additional and/or non-disclosed ranges.

In one embodiment, if present, the one or more additional additives of the present invention can be added to either one of, or both of, the isocyanate portion and/or the polyol portion used to create the polyurethane foams of the present invention.

In another embodiment, the polyurethane foams, or the components used to form the foams of the present invention, are substantially free from various compounds including, but not limited to, benzene or benzene-containing, compounds.

By "substantially free" it is meant that the polyurethane foams of the present invention contain less than about 5 percent by weight based on the total weight of the foam and/or the foam-forming components, less than about 2.5 percent by weight based on the total weight of the foam and/or the foam-forming components, less than about 1 percent by weight based on the total weight of the foam and/or the foam-forming components, less than about 0.5 percent by weight based on the total weight of the foam and/or the foam-forming components, less than about 0.1 percent by weight based on the total weight of the foam and/or the foam-forming components, or even no (i.e., zero percent by weight based on the total weight of the foam and/or the foam-forming components) of one or more benzene or benezene-containing compound. Here, as well as elsewhere in the specification and claims, individual numerical values can be combined to form additional and/or non-disclosed ranges.

Foam Production Methods:

Various foam production methods for producing blown polyurethane foams are known to those of skill in the art. One such suitable method utilizes a blowing agent and foam spraying equipment from Graco. As would be apparent to those of skill in the art, various other types of foam spraying equipment are known in the art and can be utilized in conjunction with the various foam-forming formulations of the present invention to produce a polyurethane foam within the scope of the present invention. As such, a detailed discussion of various additional types of foam forming equipment is omitted herein for the sake of brevity.

Exemplary Foam Formulations:

The following foam formulations are exemplary in nature and the scope of the present invention is not limited thereto. Rather, the present invention is to be broadly construed in light of the disclosure contained in the specification and claims. It should be noted that the following foam formulations are given without the presence of the blowing agent. The blowing agent is added after the fact and the amount of blowing agent utilized is discussed in detail above. In one embodiment, the foams of the present invention are formed by combining at least one isocyanate portion with at least one polyol portion.

In one embodiment, the one or more isocyanate portions each comprise from about 0.5 percent by weight to about 35 percent by weight of one or more intumescent compounds based on the total amount of isocyanate present, or about 1 percent by weight to about 30 percent by weight of one or more intumescent compounds based on the total amount of isocyanate present, or about 2.5 percent by weight to about 25 percent by weight of one or more intumescent compounds based on the total amount of isocyanate present, or about 5 percent by weight to about 20 percent by weight of one or more intumescent compounds based on the total amount of isocyanate present, or about 7.5 percent by weight to about 17.5 percent by weight of one or more intumescent compounds based on the total amount of isocyanate present, or even about 10 percent by weight to about 15 percent by weight of one or more intumescent compounds based on the total amount of isocyanate present. In still another embodiment, the one or more isocyanate portions independently comprise from about 22.5 percent by weight to about 30 percent by weight of one or more intumescent compounds based on the total amount of isocyanate present. Here, as well as elsewhere in the specification and claims, individual numerical values can be combined to form additional and/or non-disclosed ranges.

In another embodiment, the above isocyanate and intumescent combination can optionally further comprise one or more additional compounds selected from one or more fire retardant compounds, one or more viscosity modifiers, one or more thixotropic agents, one or more colorants, one or more pigments, or any mixture of two or more thereof.

In one embodiment, if present, the one or more viscosity modifiers are present from about 0.001 percent by weight to about 5 percent by weight of one or more viscosity modifiers based on the total amount of isocyanate present, or about 0.01 percent by weight to about 2.5 percent by weight of one or more viscosity modifiers based on the total amount of isocyanate present, or about 0.1 percent by weight to about 2.0 percent by weight of one or more viscosity modifiers based on the total amount of isocyanate present, or about 0.5 percent by weight to about 1.5 percent by weight of one or more viscosity modifiers based on the total amount of isocyanate present, or even about 0.75 percent by weight to about 1.0 percent by weight of one or more viscosity modifiers on the total amount of isocyanate present. In still another embodiment, the one or more isocyanate portions independently comprise from about 0.05 percent by weight to about 0.25 percent by weight of one or more viscosity modifiers based on the total amount of isocyanate present. Here, as well as elsewhere in the specification and claims, individual numerical values can be combined to form additional and/or non-disclosed ranges.

In one embodiment, if present, the one or more thixotropic agents are present from about 0.01 percent by weight to about 10 percent by weight of one or more thixotropic agents based on the total amount of isocyanate present, or about 0.1 percent by weight to about 7.5 percent by weight of one or more thixotropic agents based on the total amount of isocyanate present, or about 0.5 percent by weight to about 5 percent by weight of one or more thixotropic agents based on the total amount of isocyanate present, or about 0.75 percent by weight to about 2.5 percent by weight of one or more thixotropic agents based on the total amount of isocyanate present, or even about 1 percent by weight to about 2 percent by weight of one or more thixotropic agents on the total amount of isocyanate present. In still another embodiment, the one or more isocyanate portions independently comprise from about 0.5 percent by weight to about 4 percent by weight of one or more thixotropic agents based on the total amount of isocyanate present. Here, as well as elsewhere in the specification and claims, individual numerical values can be combined to form additional and/or non-disclosed ranges.

In one embodiment, if present, the one or more colorants and/or pigments are present from about 1 percent by weight to about 25 percent by weight of one or more colorants and/or pigments based on the total amount of isocyanate present, or about 2.5 percent by weight to about 22.5 percent by weight of one or more colorants and/or pigments based on the total amount of isocyanate present, or about 5 percent by weight to about 20 percent by weight of one or more colorants and/or pigments based on the total amount of isocyanate present, or about 7.5 percent by weight to about 15 percent by weight of one or more colorants and/or pigments based on the total amount of isocyanate present, or even about 10 percent by weight to about 12.5 percent by weight of one or more colorants and/or pigments on the total amount of isocyanate present. In still another embodiment, the one or more isocyanate portions independently comprise from about 5 percent by weight to about 17.5 percent by weight of one or more colorants and/or pigments based on the total amount of isocyanate present. Here, as well as elsewhere in the specification and claims, individual numerical values can be combined to form additional and/or non-disclosed ranges.

In one embodiment, the one or more polyol portions each comprise from about 0.5 percent by weight to about 25 percent by weight of one or more intumescent compounds based on the total amount of polyol present, or about 1 percent by weight to about 22.5 percent by weight of one or more intumescent compounds based on the total amount of polyol present, or about 2.5 percent by weight to about 20 percent by weight of one or more intumescent compounds based on the total amount of polyol present, or about 5 percent by weight to about 17.5 percent by weight of one or more intumescent compounds based on the total amount of polyol present, or about 7.5 percent by weight to about 15 percent by weight of one or more intumescent compounds based on the total amount of polyol present, or even about 10 percent by weight to about 12.5 percent by weight of one or more intumescent compounds based on the total amount of polyol present. In still another embodiment, the one or more polyol portions independently comprise from about 14 percent by weight to about 22 percent by weight of one or more intumescent compounds based on the total amount of polyol present. Here, as well as elsewhere in the specification and claims, individual numerical values can be combined to form additional and/or non-disclosed ranges.

In another embodiment, the above polyol and intumescent combination can optionally further comprise one or more additional compounds selected from one or more fire retardant compounds, one or more viscosity modifiers, one or more thixotropic agents, one or more colorants, the one or more pigments, or any mixture of two or more thereof.

In one embodiment, if present, the one or more viscosity modifiers are present from about 0.001 percent by weight to about 5 percent by weight of one or more viscosity modifiers based on the total amount of polyol present, or about 0.01 percent by weight to about 2.5 percent by weight of one or more viscosity modifiers based on the total amount of polyol present, or about 0.1 percent by weight to about 2.0 percent by weight of one or more viscosity modifiers based on the total amount of polyol present, or about 0.5 percent by weight to about 1.5 percent by weight of one or more viscosity modifiers based on the total amount of polyol present, or even about 0.75 percent by weight to about 1.0 percent by weight of one or more viscosity modifiers on the total amount of polyol present. In still another embodiment, the one or more polyol portions independently comprise from about 0.1 percent by weight to about 0.25 percent by weight of one or more viscosity modifiers based on the total amount of polyol present. Here, as well as elsewhere in the specification and claims, individual numerical values can be combined to form additional and/or non-disclosed ranges.

In one embodiment, if present, the one or more thixotropic agents are present from about 0.01 percent by weight to about 10 percent by weight of one or more thixotropic agents based on the total amount of polyol present, or about 0.1 percent by weight to about 7.5 percent by weight of one or more thixotropic agents based on the total amount of polyol present, or about 0.5 percent by weight to about 5 percent by weight of one or more thixotropic agents based on the total amount of polyol present, or about 0.75 percent by weight to about 2.5 percent by weight of one or more thixotropic agents based on the total amount of polyol present, or even about 1 percent by weight to about 2 percent by weight of one or more thixotropic agents on the total amount of polyol present. In still another embodiment, the one or more polyol portions independently comprise from about 0.5 percent by weight to about 2 percent by weight of one or more thixotropic agents based on the total amount of polyol present. Here, as well as elsewhere in the specification and claims, individual numerical values can be combined to form additional and/or non-disclosed ranges.

In one embodiment, if present, the one or more colorants and/or pigments are present from about 1 percent by weight to about 25 percent by weight of one or more colorants and/or pigments based on the total amount of polyol present, or about 2.5 percent by weight to about 22.5 percent by weight of one or more colorants and/or pigments based on the total amount of polyol present, or about 5 percent by weight to about 20 percent by weight of one or more colorants and/or pigments based on the total amount of polyol present, or about 7.5 percent by weight to about 15 percent by weight of one or more colorants and/or pigments based on the total amount of polyol present, or even about 10 percent by weight to about 12.5 percent by weight of one or more colorants and/or pigments on the total amount of polyol present. In still another embodiment, the one or more polyol portions independently comprise from about 5 percent by weight to about 17.5 percent by weight of one or more colorants and/or pigments based on the total amount of polyol present. Here, as well as elsewhere in the specification and claims, individual numerical values can be combined to form additional and/or non-disclosed ranges.

In one embodiment, the polyurethane foam compositions of the present invention comprise from about 1 percent by weight to about 50 percent by weight of one or more intumescent compounds based on the total amount of polyurethane present, or about 2.5 percent by weight to about 45 percent by weight of one or more intumescent compounds based on the total amount of polyurethane present, or about 5 percent by weight to about 40 percent by weight of one or more intumescent compounds based on the total amount of polyurethane present, or about 7.5 percent by weight to about 35 percent by weight of one or more intumescent compounds based on the total amount of polyurethane present, or about 10 percent by weight to about 30 percent by weight of one or more intumescent compounds based on the total amount of polyurethane present, or about 12.5 percent by weight to about 25 percent by weight of one or more intumescent compounds based on the total amount of polyurethane present, or even about 15 percent by weight to about 22.5 percent by weight of one or more intumescent compounds based on the total amount of polyurethane present. In still another embodiment, the polyurethane foams of the present invention comprise from about 45 percent by weight to about 55 percent by weight of one or more intumescent compounds based on the total amount of polyurethane present. Here, as well as elsewhere in the specification and claims, individual numerical values can be combined to form additional and/or non-disclosed ranges.

In another embodiment, the above polyurethane foams of the present invention can optionally further comprise one or more additional compounds selected from one or more fire retardant compounds, one or more viscosity modifiers, one or more thixotropic agents, one or more colorants, the one or more pigments, or any mixture of two or more thereof.

In one embodiment, if present, the one or more viscosity modifiers are present from about 0.001 percent by weight to about 10 percent by weight of one or more viscosity modifiers based on the total amount of polyurethane present, or about 0.01 percent by weight to about 7.5 percent by weight of one or more viscosity modifiers based on the total amount of polyurethane present, or about 0.1 percent by weight to about 5 percent by weight of one or more viscosity modifiers based on the total amount of polyurethane present, or about 0.5 percent by weight to about 2.5 percent by weight of one or more viscosity modifiers based on the total amount of polyurethane present, or even about 0.75 percent by weight to about 1.0 percent by weight of one or more viscosity modifiers on the total amount of polyurethane present. In still another embodiment, the polyurethane foams of the present invention comprise from about 0.5 percent by weight to about 0.4 percent by weight of one or more viscosity modifiers based on the total amount of polyurethane present. Here, as well as elsewhere in the specification and claims, individual numerical values can be combined to form additional and/or non-disclosed ranges.

In one embodiment, if present, the one or more thixotropic agents are present from about 0.01 percent by weight to about 20 percent by weight of one or more thixotropic agents based on the total amount of polyurethane present, or about 0.1 percent by weight to about 15 percent by weight of one or more thixotropic agents based on the total amount of polyurethane present, or about 0.5 percent by weight to about 12.5 percent by weight of one or more thixotropic agents based on the total amount of polyurethane present, or about 1 percent by weight to about 10 percent by weight of one or more thixotropic agents based on the total amount of polyurethane present, or even about 2.5 percent by weight to about 7.5 percent by weight of one or more thixotropic agents on the total amount of polyurethane present. In still another embodiment, the polyurethane foams of the present invention comprise from about 2.5 percent by weight to about 4 percent by weight of one or more thixotropic agents based on the total amount of polyurethane present. Here, as well as elsewhere in the specification and claims, individual numerical values can be combined to form additional and/or non-disclosed ranges.

In one embodiment, if present, the one or more colorants and/or pigments are present from about 1 percent by weight to about 25 percent by weight of one or more colorants and/or pigments based on the total amount of polyurethane present, or about 2.5 percent by weight to about 22.5 percent by weight of one or more colorants and/or pigments based on the total amount of polyurethane present, or about 5 percent by weight to about 20 percent by weight of one or more colorants and/or pigments based on the total amount of polyurethane present, or about 7.5 percent by weight to about 15 percent by weight of one or more colorants and/or pigments based on the total amount of polyurethane present, or even about 10 percent by weight to about 12.5 percent by weight of one or more colorants and/or pigments on the total amount of polyurethane present. In still another embodiment, the polyurethane foams of the present invention comprise from about 5 percent by weight to about 17.5 percent by weight of one or more colorants and/or pigments based on the total amount of polyurethane present. Here, as well as elsewhere in the specification and claims, individual numerical values can be combined to form additional and/or non-disclosed ranges.

Regarding the exemplary formulations of the present invention, it should be noted that any amount of additional additives can be utilized herein so long as the isocyanate and polyol portions of the present invention remain sprayable, pourable and/or injectible (depending upon the desired application, instillation technique and/or method of manufacture) and produce a polyurethane foam in accordance with the present invention.

Building Codes:

In one embodiment, the polyurethane foams of the present invention are designed to meet specific building code requirements for foam plastic products including fire performance. In this regard, building codes in the United States require all foam plastic and assemblies containing foam plastics such as foam plastic insulation in factory-produced insulated building panels to have specific fire performance as determined by nationally recognized fire test methods, standards and performance criteria depending upon the application and whether such application is on the interior or exterior of buildings.

To that end, two types of fire tests are required for all applications: (1) small-scale flame spread and smoke development tests; and (2) full-scale fire tests that measure flame propagation, heat release rates, smoke emission and time to create flashover conditions. Flashover is the temperature point at which the heat in an area or region reaches the flash-ignition or self-ignition temperatures of flammable materials present resulting in the ignition and burning of such materials simultaneously.

Small-scale flame-spread and smoke development tests are used to determine numerical ratings of a particular foam product. The test used to obtain results from which a rating is calculated is called Method of Test of Surface Burning Characteristics of Building Materials (ASTM E-84, UL-723 and NFPA 255). This test is commonly referred to as the "tunnel test." The test equipment is referred to as the 25-foot tunnel. The building regulations have not accepted any alternate methods for determining the numerical flame-spread and smoke development characteristics of materials to be used in buildings.

In this test, the sample of material to be tested (minimum 20 inches wide and 25 feet long) is installed beneath the removable top panel. A gas flame is applied at one end and regulated constant draft is directed through the tunnel from the flame end. The progress of the flame front along the sample is observed through side windows. Smoke development is measured by photoelectric cell and compared to smoke emission of red oak flooring. Base-line ratings of red oak flooring having a flame spread of 100 and a smoke development rating of 450 are established by this method. Relative estimates on how fast the flame of the tested material spreads over the surface enables fire protection engineers to deal with problems involving possibilities of people being trapped in a building before orderly evacuation can be accomplished; before the usual fire protection measures can be put into effect to control or extinguish the fire. Building codes group flame spread ratings into three classifications:

(1) Class A equals flame-spread ratings of 0 to 25;
(2) Class B equals flame-spread ratings of 26 to 75; and
(3) Class C equals flame-spread ratings of 76 to 200.

Building codes require foam plastic (including foam insulation products) to have a 75 or less flame-spread in most applications and a zero to 25 flame-spread in some locations. Most foam plastic manufacturers have been able to add commonly used fire-retardants to achieve flame-spread ratings as low as 10. On the other hand, considerable difficulty has occurred in obtaining a 450 or less smoke development rating required by building codes.

Generally, polyurethane foam materials generate black smoke and commonly used fire-retardants often further increase smoke emission. The smoke development rating in the tunnel test is a function of how much of the foam burns, the chemical composition of the foam, and/or the thickness at which the foam is applied. The building codes require foam plastic to be tested in the maximum thickness and density to be used on a given project. Although low flame-spread foam in four inches or less can achieve a 450 or less smoke development rating, thicknesses greater than 4 inches or more often have a smoke development rating of more than 450. Consequently, there is a need in the building arts for a polyurethane foam that achieves the above-mentioned smoke development rating when utilized at a wide range of thickness including thickness greater than 4 inches.

The Federal Trade Commission, nationally recognized fire testing laboratories such as Underwriters Laboratories, Inc., (UL) and building code organizations have determined the numerical flame spread and smoke development ratings developed by the tunnel test are not indicative of the actual fire performance of foam plastics (including foam insulation products) since even materials having flame spread ratings of 25 or less can quickly result in flashover conditions occurring in real fires. Consequently, in addition to the previously described small-scale fire tests that determine flame spread and smoke development ratings, building codes also require foam plastics to comply with full-scale fire tests and performance requirements.

As a result, in addition to having the necessary flame-spread and smoke development ratings, building codes require foam plastic insulation at any and all thicknesses to be full-scale fire tested unless one-half inch gypsum wall board or other materials having 15 minutes of fire resistance are installed over the foam insulation to provide a thermal barrier between habitable spaces and the foam insulation. The thermal barrier must resist simulated fire temperatures of approximately 1200° F. for 15-minutes and prevent the temperature at the interface of the foam plastic and the thermal barrier from reaching an average of 250° F. above ambient temperature or 325° F. above ambient temperature at any one measuring point. The test method for this determination is the Standard Method of Test of Fire Resistance of Building Construction Materials, commonly referred to as ASTM E-119, UL-263 and NFPA 251 test methods.

Foam plastic (also referred to herein as foam insulation) can be installed as thermal and/or sound insulation in buildings in spray form, and board form and factory-produced wall and roof panels. In applications where the foam plastic is sprayed between structural members such as metal or wood framing in walls or roofs, sheet materials providing the 15-minute thermal barrier such as gypsum wall board are commonly used. Such sheet materials are mechanically or adhesively fastened to the framing thus separating the foam plastic from occupied spaces.

Where the foam plastic (also referred to herein as foam insulation) is sprayed, installed as boards or building panels on the interior or exterior of walls, roofs and ceilings and where no structural framing is present to attach sheet thermal barriers, liquid-applied thermal barriers are necessary. Several liquid-applied thermal barriers have been developed and are available that provide the required 15 minute fire resistance. Such materials are typically applied at a thickness of one-inch or less.

Foam plastics (also referred to herein as foam insulation) meeting the full-scale, standard fire tests and performance criteria are permitted to be installed without 15 minute thermal barrier protection. Such foam plastic can therefore be left exposed or covered with thin coatings such as paints which have more economical material costs and faster, simpler installation methods than the much thicker 15 minute thermal barriers such as half inch gypsum board. For example, metal facers on foam plastic insulation boards are able to show acceptable full-scale fire performance even though the metal only has several seconds of fire resistance compared to 15-minutes of fire resistance with one-half inch gypsum board or equivalent fire resistant material.

Six types of full-scale fire tests are used to qualify foam plastic materials; three types of tests are used for interior applications and three types of tests are used for exterior applications. For interior applications, one type of test is an open corner test designated as FM 4880 and UL-1040 that consist of two walls forming an open corner with a ceiling. These tests utilize walls ranging from 25 to 50 feet in height and 20 to 50 feet in length. A 750-pound wood crib is ignited in the corner formed by the two walls. This test can be run with wall specimens only, with roof and/or ceiling specimens only, or even with both wall and roof and/or ceiling specimens. Performance is acceptable if the foam insulation with, or without, any protective surfaces does not propagate flame to the extremities of the test specimens. These are very expensive tests and have generally been replaced by the smaller, enclosed room test described herein.

The second type of full-scale fire tests for interior applications is an enclosed room test designated as UL-1715 Fire Test of Interior Finish Material, NFPA 286 designated as Standard Methods of Fire Tests for Evaluating Contribution of Wall and Ceiling Interior Finish to Room Fire Growth and ISO 9705 designated as Full-scale Room Test for Surface Products. This test consists of a room measuring 8 feet in width and 12 feet in length by 8 feet in height including a ceiling. The room is typically constructed with gypsum wall board attached to steel wall and ceiling framing. Foam plastic, or foam insulation, test specimens are installed on two or three walls extending 8 feet from the corner and ceiling or roof panels are installed in an 8 foot by 8 foot dimension in the ceiling and adjacent to the corner where a 30-pound wood crib or a gas ignition source is located. The test can be run with wall specimens only, roof/ceiling specimens only or both wall and roof/ceiling specimens. Performance is considered acceptable if the following criteria are met: (i) observed surface burning does not extend to the extremities of any of the test specimen panels; (ii) flames do not project through the door of the test room at any time during the length of the test (15 minutes after ignition); and (iii) at the conclusion of the test observations show that the burning on any and all test specimens diminishes with increasing distance from the ignition source. Smoke emission, rate of heat release and whether flashover occurs is also measured and documented by photographs and videos. Because the room test is a relatively economical test to perform and small-scale, bench-type tests have been shown as not being indicative of the actual fire performance of foam plastics, this room test is the most commonly utilized full-scale fire test method for qualifying foam plastics for use in habitable spaces within buildings as required by building codes.

The third type of full-scale fire test for interior applications is SWRI 199-02 Fire Test Method for Attics and Crawl Spaces. The test module consists of three 8 foot long walls, each 48" height with a full open space on one side of the structure. Walls are made of masonry or constructed of wood or metal studs with gypsum board installed on the interior of the room. The ceiling is constructed with two inch by eight inch wood floor joists with 15/32 inch thick plywood subflooring. A 22 pound wood crib is placed in the rear corner of the crawl space. After ignition, the tested foam plastic products are evaluated as to the time duration for flames to emerge from the front of the crawl space and also the time to burn through the ceiling. An acceptable criterion is that the performance must be similar to traditional wood products. This test procedure is only valid for non-occupied and non-habitable spaces such as attics and crawl spaces but is being questioned as to its suitability for these applications. This test is being abandoned in favor of the UL-1715 or NFPA 286 test but with acceptable fire performance criteria being similar to foam insulation covered with quarter inch thick plywood.

The fourth type of full-scale fire test is for exterior applications of foam plastic products designated as NFPA 285 Standard Fire Test Method for Evaluation of Fire Propagation Characteristics of Exterior Non-Load-Bearing Wall Assemblies Containing Combustible Components. The test apparatus consists of a nominal 16 foot 10 inch height by 13 foot 4 inch wide chamber with the test specimens mounted on the exterior vertical surface. A gas burner with established flow rates provides an igniting flame on the lower edge of the test specimen for a 30 minute period. Performance requirements are that the flame propagation on the exterior face of the wall assembly shall not occur vertically or horizontally beyond the area of flame plume impingement by the ignition source.

The fifth type of fire test which can be used for interior or exterior applications is a full-scale, fire resistance test titled Standard Method of Test of Fire Resistance of Building Construction Materials and designated as ASTM E-119, UL-263 and NFPA 251 test methods. The test specimen is ten feet by ten feet in size and is constructed with the specific materials and products desired for approval. The test specimens can be in a vertical or horizontal configuration. The wall, ceiling or roof assembly containing the foam plastic is subjected to simulated fire temperatures of approximately 1200° F. on the underside of the horizontal specimen or on one side of the vertical specimen. The fire rating is determined by the time when the unexposed surface reaches 250° F. above ambient temperature or 325° F. at any one measuring point. Results are reported in hours and fractions of hours such as a "two hour" wall assembly.

The sixth type of fire test is used for roof assemblies and are titled UL-1256 Fire Test of Roof Deck Construction and ASTM E-108 and UL-790 Standard Test Methods for Fire Tests of Roof Coverings. UL-1256 simulates fires occurring on the underside of roofs and utilizes a test specimen 1.48 feet wide by 24 feet long. A 5,000 BTU/minute natural gas burner is applied to the underside of the roof assembly at one edge for 30 minutes. Acceptance criteria is that flame spread shall not exceed 10 feet in 10 minutes, or 14 feet in 30 minutes. ASTM E-108 and UL-790 simulate fires occurring on the top side of roofs and utilize a test specimen 40 inches by 52 inches. The test specimen is installed at the selected roof slope for which approval is desired. The flames from a 1400° F. gas burner ignition source are placed on the upper surface at the lower edge of the test specimen for 10 minutes. Fire ratings are based on the distance the burning travels during the 10 minute period.

The primary technical approach to develop technical and economic solutions for foam plastic products to meet the required performance of these six types of full-scale fire tests has been to develop fire retardant surfaces applied over the foam plastic since developing more fire retardant foam plastics has not been accomplished with available fire retardant technology. The fire retardant coatings or surfaces that are able to pass these tests are often cost-prohibitive for large volume, potential applications.

Given the above, in one embodiment the present invention utilizes one or more intumescent compounds (e.g., expandable graphite) as a fire retardant in a polyurethane foam (rigid, semi-rigid, or flexible), in both spray, board and building panel form, to meet the acceptance criteria of the full-scale fire tests and "tunnel tests" described above. In another embodiment, the polyurethane foams of the present invention can additionally utilize one or more non-intumescent flame retardant compounds as described above. Due to various properties of the polyurethane foams of the present invention, polyurethane foams can be formulated that can comply with the acceptance criteria of the full-scale fire tests without any protective surface. In still another embodiment, the present invention makes possible the use of various protective surfaces that are installed over the foams of the present invention where such thin surfaces are cost effective or needed for enhanced performance such as durability, appearance or water and vapor resistance. While not limited thereto, foams according to these embodiments of the present invention can be applied on walls, roofs, ceilings, structural steel, tanks and on other building components and within building panels in both interior and exterior applications.

EXAMPLES

The following formulations are exemplary in nature and are non-limiting in scope and nature. The scope of the invention is to be broadly construed in light of the disclosure contained herein.

In addition to formulating polyurethane foam having increased fire retardant properties, the fire-retardant foams in accordance with the present invention are formulated to have the necessary properties for storage, transportation and dispensability (via, for example, spraying, pouring and/or injecting). In regard to storage, an acceptable shelf-life is important. Shelf-life is the length of time the products are usable subsequent to their production date. In this regard, the moisture content of the one or more fire-retardants are reduced to acceptable levels to avoid one or more detrimental chemical reactions between the moisture in the one or more fire retardants and the isocyanate component of the polyurethane foam which can result in unacceptable shelf-life as short as six hours. By reducing the moisture content in the expandable graphite to less than about 0.25 percent by weight, an acceptable shelf-life of at least about 30 days can be achieved, at least about 60 days, at least about 90 days, or even at least about 120 days. Here, as well as elsewhere in the specification and claims, individual range limits can be combined to form additional and/or non-disclosed ranges.

In another embodiment, shelf-life can be lengthened by the inclusion of one or more shelf-life extending compounds. Such shelf-life extending compounds include, but are not limited to, one or more water scavenging compounds, one or more preservatives, one or more anti-settling compounds, or any suitable combination of two or more thereof.

Settling and compaction of the fire-retardant particles in the liquid polyurethane foam components during storage, transportation and spraying (or in other embodiments during pouring or injection) should also be prevented. Table 1 describes a typical formulation that prevents unacceptable settling and compaction by creating the necessary viscosities of the polyol and isocyanate components, utilizing specific expandable graphite particle sizes and shapes and the use of thixotropic agents such as fumed silica. It should be noted again, that formulation of Table 1 is only exemplary in nature and that the invention is not limited to solely this formulation. Rather, the present invention is to be broadly construed in light of the disclosure contained herein.

In one embodiment, the fire-retardant polyurethane foams in accordance with the present invention are subsequently covered with coatings since the addition of fire-retardants such as expandable graphite can create a foam having a black or dark gray color which can be aesthetically unacceptable where the products are exposed to view in their installed location. Alternatively, colorants, dyes, and/or pigments can be used in the fire-retardant polyurethane foams of the present invention to control, mute or shift the color of the installed foam product. Such colorants, dyes and/or pigments are known to those of skill in the art. As such, a detailed discussion herein is omitted for the sake of brevity. Given this, the formulation shown in Table 1 includes titanium dioxide white powder pigment to achieve an aesthetically acceptable white or light gray color without the necessity of subsequently applied coatings.

The present invention achieves the properties required to enable the fire-retardant polyurethane foam products to be properly sprayed (or in other embodiments during poured or injected) to achieve the required chemical mixing, spray patterns, pounds-per-minute output, acceptable pressures within the equipment and required physical and fire-retardant properties of the sprayed (or in other embodiments during poured or injected) and cured final product. To achieve proper chemical reaction, the polyol and isocyanate polyurethane foam components are pumped through two individually heated hoses and filters at equal or nearly equal volumes and are mixed together internally within the spray gun, spray equipment, injection equipment and/or pouring equipment. In another embodiment, as would be apparent to those of skill in the art, the present invention is not limited to spray, pour and/or injection applications where equal, or nearly equal, volumes are mixed together internally within the spray gun. Rather, any suitable ratio of the components that are combined to generate the sprayed foam can be used. Such ratios include, but are not limited to, polyol to isocyanate ratios in the range of from about 1:20 to about 20:1, or from about 1:10 to about 10:1, or even from about 1:5 to about 5:1. Here, as well as elsewhere in the specification and claims, individual range limits can be combined to form additional and/or non-disclosed ranges.

The chemical reaction and resultant expansion typically occur within one or two seconds immediately after mixing. Virgin polyols and isocyanates (materials without particulate fire-retardants or fillers) have different viscosities and specific gravities. Unless compensated by different pump pressures and different heats applied to each component, a pressure imbalance occurs where the materials are injected into each other within the spray gun. This imbalance results in the component having the higher pressure entering the supply hose containing the lower pressure component and creates a partial chemical reaction that solidifies within the spray gun. The addition of particulate fire-retardants such as expandable graphite creates significant difficulty in developing sprayable formulations since viscosities, pump pressures and spray pressures are all increased. Accordingly, the ability to obtain suitable temperatures within the spray equipment is difficult and orifices as small as 0.0292 inches within the equipment and can easily pack and/or plug. The present invention solves these difficulties by creating formulations using varying fire-retardant particle sizes, varying quantities of such particles, using viscosity modifiers such as polyoxyalkylene and varying processing temperatures of the polyol and isocyanate components. Modifying these variables achieves the required viscosities, pressure balances, chemical mixing and/or spray patterns to obtain the necessary physical and fire retardant properties of the mixed, sprayed (or in some embodiments poured or injected) and cured polyurethane foam.

The temperature necessary for spraying, pouring and/or injecting the polyurethane foams of the present invention, as well as the temperature necessary for maintaining the stability of the one or more intumescent compounds and/or the one or more non-intumescent fire-retardants of the polyurethane foams of the present invention, must both be in same temperature range. The typical blowing agents used in the polyol components of rigid polyurethane foam begin to activate at about 82° F. to about 95° F. when exposed to air but must be heated to approximately 130° F. within pumps and hoses in order to have viscosities required to be dispensed. Accordingly, suitable fire-retardants must activate at temperatures higher than 130° F. to avoid activation within the dispensing equipment. To be effective as a fire-retardant in rigid polyurethane foams, the fire-retardants must activate at temperatures below the about 700° F. to about 800° F. flash ignition temperatures of typical rigid polyurethane foams. In another embodiment, the fire-retardants must activate at temperatures of about 300° F. The flash ignition temperature is the lowest temperature at which a material will ignite in the presence of a pilot ignition source. Table 1 shows one embodiment of the present invention where the rigid polyurethane foam begins to intumesce at 302° F. so that activation can occur, thereby resulting in the creation of an insulating char. Thus, the formulation of Table 1 is effective in the very early stages of fire ignition and development.

The most effective fire-retardants will also substantially increase the flash ignition temperature to prevent the foam from igniting and burning when actual fire temperatures are below such temperatures. The formulation shown in Table 1 results in a rise of the flash ignition temperatures from a typical range of about 700° F. about 800° F. for a typical rigid polyurethane foam to an increased level of at least about 900° F., at least about 950° F., at least about 1000° F., at least about 1050° F., or even at least about 1100° F. This is vast improvement since the performance criteria in the full-scale fire tests such as UL-1715, NPFA 286, FM 4880 and UL-1040 require the foam insulation tested must not propagate the fire laterally from the corner ignition source to the extremity of the test specimens. One suitable method of determining whether the foam insulation propagated fire and burned at the extremities of the test specimen is to measure the temperatures that occurred at such extremities. Measured temperatures below the flash ignition temperature of the foam indicate the foam did not ignite nor burn and the performance criteria is therefore met demonstrating the product's acceptable compliance with building code requirements for installation in occupied and unoccupied locations. The formulation shown in Table 1 achieves the required fire performance of the UL-1715 full-scale fire test procedure as tested and reported by NGC Testing Services which is accredited by the International Accreditation Service, Inc. to conduct this test.

TABLE 1

| Component | Isocyanate Portion | Polyol Portion |
|---|---|---|
| Virgin Material | 100 lbs Isocyanate[1] | 100 lbs Polyol[2] |
| Nyagraph Expandable Graphite | 29 lbs | 21 lbs |
| BYK 20358 Viscosity Reducer | 0.1 lbs | 0.25 lbs |
| Fumed Silica | 2.3 lbs | 0.6 lbs |

TABLE 1-continued

| Component | Isocyanate Portion | Polyol Portion |
|---|---|---|
| Dupont R-706 TiO$_2$ Pigment | 7 lbs | 5 lbs |
| Viscosity at 100° F. | 990 cps | 1200 cps |
| Expandable Graphite Particle Distribution | | |
| Greater Than 500 Microns | 0.08% | 0.12% |
| 420 to 500 Microns | 5.18% | 7.59% |
| 354 to 420 Microns | 30.26% | 44.34% |
| 297 to 354 Microns | 32.73% | 47.95% |
| 250 to 297 Microns | 15.63% | 0% |
| 74 to 250 Microns | 16.12% | 0% |

[1]Supplied by Huntsman Company, a mixture of diphenylmethane diisocyanate (MDI - mixed isomers), 4-4'-diphenylmethane diisocyanate (MDI), and polymeric diphenylmethane diisocyanate (pMDI).
[2]Supplied by Resin Technology, a division of Henry Company and designated as Polyol RT-2045-B.

The above formulation is subjected to a flash ignition temperature test by Polyhedron Laboratories, Inc. (ASTM D 1929) and the flash ignition temperature is determined to be 520° C.

A second formulation is shown in Table 2 and is used in various fire tests as noted below.

TABLE 2

| Component | Isocyanate Portion | Polyol Portion |
|---|---|---|
| Virgin Material | 100 lbs Isocyanate[1] | 100 lbs Polyol[2] |
| Nyagraph Expandable Graphite | 27.1 lbs | 26.3 lbs |
| BYK P-9915 Polyoxyalkylene | None | 0.13 lbs |
| Fumed Silica | 0.6 lbs | 1.5 lbs |
| OMG Benzenesulfonyl Isocyanate, 4-Methyl | 1.3 lbs | None |
| Viscosity at 100° F. | 810 cps | 1480 cps |
| Expandable Graphite Particle Distribution | | |
| Greater Than 500 Microns | 0% | 0% |
| 420 to 500 Microns | 28.72% | 28.72% |
| 354 to 420 Microns | 34.60% | 34.60% |
| 297 to 354 Microns | 20.42% | 20.42% |
| 250 to 297 Microns | 7.44% | 7.44% |
| 74 to 250 Microns | 8.82% | 8.82% |

[1]Supplied by Huntsman Company, a mixture of diphenylmethane diisocyanate (MDI - mixed isomers), 4-4'-diphenylmethane diisocyanate (MDI), and polymeric diphenylmethane diisocyanate (pMDI).
[2]Supplied by BASF Polyurethane Foam Enterprises LLC and designated as Polyol Spraytite 178.

Room Fire Test 1:

Next the formulation of Table 1 is sprayed to produce a polyurethane foam composition and the resulting foam is spray-applied to a nominal thickness of about 1.4 inches to four pieces of gypsum wall board (0.5 inches by 4 foot by 8 foot). These four pieces of wallboard are then assembled into the back 8 foot by 8 foot wall and the 8 foot by 8 foot portion of the left wall of the test room extending from the back wall towards the front wall with the door (see FIG. 1) as described below. The test room is designed in accordance with Test Method UL-1715. The complete room, including the ceiling, is constructed from cement board by affixing the necessary pieces, including those with the inventive foam of the present invention mounted thereon, to 20 gauge steel studs. The panels are fastened to the steel studs described above with 1.875 inch type S-12 drywall screws through 1.5 inch tin cap washers spaced according to the above-mentioned Test Method UL-1715. The joint of the corner where the test panels meet is left untreated. The test room is then permitted to condition at a temperature of 73° F. (±4° F.) and 50% relative humidity (±5%).

Regarding the construction of the test room, as is noted above, 20 gauge galvanized steel studs measuring 3.625 inches by 8 feet are spaced 24 inches apart, on center, for the walls and 16 inches apart, on center, for the ceiling. The room has four walls with the north and south walls being 8 feet wide (±0.5 inch) and the east and west walls are 12 feet long (±0.5 inch). All walls are 8 feet tall and the north wall has an opening 2.5 feet wide by 7 feet tall located in the center thereof and opposite the south wall.

Next, a wood crib composed of 50 sticks measuring 2 inches by 2 inches by 15 inches in 10 alternating tiers is constructed from spruce/pine/fir lumber. Each subsequent layer is secured to the layer below with one 8d common nail into each end of each stick. The completed crib is conditioned at 120° F. (±10° F.) and 20% relative humidity (±5%). Additionally, the crib is adjusted to a weight of 30 pounds (±1 pound). The crib is then located as is illustrated by FIG. 1 in the back left corner of the room (represented by the small square having an X contained therein). One pound of shredded, fluffed wood excelsior is placed around the base of the crib. The crib is then placed in the location shown in FIG. 1 and is located 3 inches from the adjacent walls. The excelsior is soaked with 4 ounces of ethyl alcohol except for a 6 inch by 6 inch portion area diametrically opposite the wall intersection. Test time commences upon ignition of the excelsior. Test room conditions are 68° F. and 46% relative humidity at the start of the test.

Ignition source thermocouples consisting of 4-18 gauge ceramic shielded type K thermocouples placed in a 0.5 inch diameter stainless pipe are utilized in the test. The thermocouple tip is projected 1 inch from the end of the insulation and 3 inches beyond the end of the pipe. The thermocouple assemblies are fixed to a metal support and pre-set to the required elevations as noted below. Thermocouple locations are also shown in FIG. 1.

Thermocouple Locations (see FIG. 1):

Thermocouple 1—1 inch below the ceiling of the test room and 4 feet from each side wall and the back wall;
Thermocouple 2—60 inches below the ceiling of the test room and 3 inches from each wall of the back left corner;
Thermocouple 3—36 inches below the ceiling of the test room and 3 inches from each wall of the back left corner;
Thermocouple 4—12 inches below the ceiling of the test room and 3 inches from each wall of the back left corner;
Thermocouple 5—1 inch below the ceiling of the test room and 3 inches from each wall of the back left corner;
Thermocouple 6—1 inch below the ceiling of the test room and 4 feet from the back wall and 3 inches from the left side wall;

Thermocouple 7—36 inches below the ceiling of the test room and 4 feet from the back wall and 3 inches from the left side wall;
Thermocouple 8—1 inch below the ceiling of the test room and 8 feet from the back wall (sample wall) and 3 inches from the left side wall;
Thermocouple 9—center of the doorway and 1 inch below the top of the doorway opening; and
Thermocouple 10—1 inch below the ceiling of the test room and 3 inches from each wall of the back right corner.

Temperature measurements are taken at 15 second intervals (a quarter of a minute) at each thermocouple (TC). The temperatures in Fahrenheit at each thermocouple are listed in Table 3 below.

TABLE 3

| Time (minutes) | TC1 | TC2 | TC3 | TC4 | TC5 | TC6 | TC7 | TC8 | TC9 | TC10 |
|---|---|---|---|---|---|---|---|---|---|---|
| 0 | 68 | 68 | 68 | 68 | 69 | 68 | 66 | 67 | 67 | 68 |
| 0.25 | 76 | 69 | 72 | 70 | 72 | 76 | 67 | 70 | 67 | 68 |
| 0.5 | 86 | 73 | 81 | 75 | 77 | 89 | 68 | 77 | 68 | 72 |
| 0.75 | 100 | 78 | 93 | 85 | 84 | 107 | 70 | 84 | 68 | 76 |
| 1 | 158 | 98 | 143 | 118 | 110 | 199 | 77 | 122 | 69 | 94 |
| 1.25 | 269 | 187 | 282 | 199 | 161 | 327 | 90 | 188 | 78 | 138 |
| 1.5 | 469 | 413 | 683 | 452 | 329 | 632 | 122 | 333 | 92 | 223 |
| 1.75 | 701 | 779 | 1220 | 989 | 714 | 1095 | 210 | 643 | 129 | 375 |
| 2 | 787 | 1114 | 1488 | 1338 | 1027 | 1223 | 280 | 734 | 162 | 498 |
| 2.25 | 829 | 1337 | 1615 | 1502 | 1206 | 1278 | 323 | 795 | 163 | 585 |
| 2.5 | 840 | 1495 | 1649 | 1579 | 1311 | 1241 | 330 | 838 | 197 | 625 |
| 2.75 | 843 | 1644 | 1645 | 1606 | 1366 | 1255 | 331 | 862 | 205 | 650 |
| 3 | 861 | 1691 | 1621 | 1618 | 1401 | 1259 | 346 | 896 | 217 | 674 |
| 3.25 | 871 | 1660 | 1588 | 1616 | 1423 | 1242 | 376 | 902 | 228 | 696 |
| 3.5 | 852 | 1613 | 1566 | 1613 | 1441 | 1158 | 383 | 924 | 250 | 721 |
| 3.75 | 853 | 1590 | 1562 | 1616 | 1454 | 1189 | 398 | 933 | 263 | 741 |
| 4 | 843 | 1572 | 1560 | 1621 | 1468 | 1149 | 398 | 928 | 274 | 748 |
| 4.25 | 839 | 1579 | 1574 | 1626 | 1485 | 1147 | 392 | 922 | 279 | 742 |
| 4.5 | 834 | 1586 | 1574 | 1620 | 1494 | 1108 | 379 | 888 | 282 | 731 |
| 4.75 | 816 | 1600 | 1585 | 1609 | 1502 | 1096 | 356 | 857 | 273 | 711 |
| 5 | 800 | 1605 | 1594 | 1599 | 1502 | 1002 | 357 | 834 | 279 | 695 |
| 5.25 | 816 | 1622 | 1602 | 1588 | 1497 | 986 | 353 | 799 | 281 | 676 |
| 5.5 | 774 | 1630 | 1604 | 1572 | 1485 | 947 | 346 | 771 | 283 | 661 |
| 5.75 | 752 | 1642 | 1603 | 1555 | 1472 | 946 | 341 | 765 | 282 | 649 |
| 6 | 750 | 1647 | 1606 | 1545 | 1459 | 909 | 339 | 764 | 283 | 639 |
| 6.25 | 752 | 1651 | 1604 | 1532 | 1447 | 950 | 333 | 732 | 286 | 626 |
| 6.5 | 759 | 1650 | 1597 | 1516 | 1433 | 904 | 329 | 732 | 287 | 622 |
| 6.75 | 744 | 1656 | 1606 | 1511 | 1425 | 917 | 331 | 722 | 289 | 614 |
| 7 | 719 | 1668 | 1594 | 1495 | 1410 | 889 | 328 | 721 | 292 | 610 |
| 7.25 | 728 | 1676 | 1588 | 1491 | 1403 | 877 | 329 | 712 | 292 | 606 |
| 7.5 | 744 | 1689 | 1591 | 1489 | 1404 | 881 | 330 | 719 | 292 | 606 |
| 7.75 | 731 | 1694 | 1583 | 1474 | 1385 | 867 | 332 | 720 | 300 | 605 |
| 8 | 734 | 1682 | 1561 | 1461 | 1371 | 860 | 339 | 723 | 289 | 604 |
| 8.25 | 732 | 1681 | 1557 | 1464 | 1374 | 861 | 334 | 734 | 294 | 607 |
| 8.5 | 738 | 1674 | 1550 | 1460 | 1370 | 867 | 331 | 708 | 295 | 600 |
| 8.75 | 743 | 1651 | 1522 | 1455 | 1364 | 877 | 330 | 715 | 299 | 603 |
| 9 | 739 | 1654 | 1519 | 1441 | 1347 | 889 | 329 | 715 | 304 | 605 |
| 9.25 | 771 | 1615 | 1485 | 1442 | 1351 | 930 | 329 | 717 | 302 | 604 |
| 9.5 | 758 | 1620 | 1497 | 1445 | 1348 | 898 | 333 | 713 | 301 | 605 |
| 9.75 | 765 | 1606 | 1487 | 1453 | 1356 | 903 | 334 | 720 | 300 | 607 |
| 10 | 764 | 1606 | 1479 | 1447 | 1357 | 897 | 334 | 720 | 303 | 607 |
| 10.25 | 756 | 1643 | 1506 | 1447 | 1360 | 863 | 340 | 724 | 304 | 608 |
| 10.5 | 765 | 1646 | 1522 | 1459 | 1367 | 888 | 342 | 716 | 308 | 606 |
| 10.75 | 762 | 1628 | 1513 | 1468 | 1376 | 874 | 337 | 726 | 314 | 608 |
| 11 | 735 | 1653 | 1520 | 1443 | 1357 | 814 | 353 | 719 | 317 | 609 |
| 11.25 | 747 | 1653 | 1500 | 1439 | 1354 | 832 | 354 | 712 | 317 | 604 |
| 11.5 | 710 | 1610 | 1477 | 1417 | 1337 | 838 | 338 | 709 | 315 | 601 |
| 11.75 | 709 | 1550 | 1424 | 1381 | 1310 | 846 | 325 | 691 | 310 | 595 |
| 12 | 697 | 1553 | 1399 | 1341 | 1277 | 795 | 306 | 678 | 310 | 586 |
| 12.25 | 680 | 1562 | 1388 | 1306 | 1246 | 758 | 301 | 668 | 310 | 578 |
| 12.5 | 651 | 1550 | 1353 | 1258 | 1202 | 755 | 294 | 643 | 306 | 567 |
| 12.75 | 622 | 1503 | 1286 | 1190 | 1150 | 728 | 278 | 627 | 305 | 554 |
| 13 | 587 | 1462 | 1241 | 1124 | 1098 | 675 | 260 | 594 | 299 | 538 |
| 13.25 | 575 | 1496 | 1243 | 1095 | 1065 | 632 | 259 | 580 | 295 | 525 |
| 13.5 | 532 | 1510 | 1217 | 1034 | 1017 | 611 | 242 | 549 | 289 | 512 |
| 13.75 | 508 | 1527 | 1218 | 993 | 977 | 567 | 231 | 527 | 283 | 498 |
| 14 | 501 | 1544 | 1217 | 971 | 952 | 561 | 228 | 520 | 282 | 485 |
| 14.25 | 488 | 1545 | 1209 | 940 | 925 | 530 | 223 | 505 | 278 | 474 |
| 14.5 | 482 | 1545 | 1200 | 913 | 899 | 516 | 219 | 492 | 274 | 463 |
| 14.75 | 481 | 1559 | 1210 | 901 | 888 | 509 | 217 | 487 | 273 | 454 |
| 15 | 469 | 1562 | 1216 | 897 | 881 | 508 | 212 | 482 | 270 | 447 |

In light of the results obtained from the above UL-1715 Test, the panels coated with a polyurethane foam in accordance with one embodiment of the present invention possess superior fire-retardant properties. This is because: (i) observed surface burning does not extend to the extremities of any of the test specimen panels; (ii) flames do not project through the door of the test room at any time during the length of the test (15 minutes after ignition); and (iii) at the conclusion of the test observations show that the burning on any and all test specimens diminishes with increasing distance from the ignition source. Given this, the polyurethane foam composition of the present invention is successful in meeting the acceptance criteria of test method UL-1715 (Fire Tests of Interior Finish Material).

Room Fire Test 2:

Next the formulation of Table 2 is sprayed to produce a polyurethane foam composition and the resulting foam is spray-applied to a nominal thickness of about 2 inches to four pieces of gypsum wall board (0.375 inches by 4 foot by 8 foot). These four pieces of wallboard are then assembled into the back 8 foot by 8 foot wall and the 8 foot by 8 foot portion of the left wall of the test room extending from the back wall towards the front wall with the door (see FIG. 1) as described below. The test room is designed in accordance with Test Method UL-1715. The complete room, including the ceiling, is constructed from cement board by affixing the necessary pieces, including those with the inventive foam of the present invention mounted thereon, to 20 gauge steel studs. The panels are fastened to the steel studs described above with 0.25 inch by 6 inch carriage bolts with 1" washers, three per panel, spaced according to the above-mentioned Test Method UL-1715. The joint of the corner were the test panels meet is left untreated. The test room is then permitted to condition at a temperature of 73° F. (±4° F.) and 50% relative humidity (±5%).

Regarding the construction of the test room, as is noted above, 20 gauge galvanized steel studs measuring 3.625 inches by 8 feet are spaced 24 inches apart, on center, for the walls and 16 inches apart, on center, for the ceiling. The room has four walls with the north and south walls being 8 feet wide (±0.5 inch) and the east and west walls are 12 feet long (±0.5 inch). All walls are 8 feet tall and the north wall has an opening 2.5 feet wide by 7 feet tall located in the center thereof and opposite the south wall.

Next, a wood crib composed of 50 sticks measuring 2 inches by 2 inches by 15 inches in 10 alternating tiers is constructed from spruce/pine/fir lumber. Each subsequent layer is secured to the layer below with one 8d common nail into each end of each stick. The completed crib is conditioned at 120° F. (±10° F.) and 20% relative humidity (±5%). Additionally, the crib is adjusted to a weight of 30 pounds (±1 pound). The crib is then located as is illustrated by FIG. 1 in the back left corner of the room (represented by the small square having an X contained therein). One pound of shredded, fluffed wood excelsior is placed around the base of the crib. The crib is then placed in the location shown in FIG. 1 and is located 3 inches from the adjacent walls. The excelsior is soaked with 4 ounces of ethyl alcohol except for a 6 inch by 6 inch portion area diametrically opposite the wall intersection. Test time commences upon ignition of the excelsior. Test room conditions are 66° F. and 38% relative humidity at the start of the test.

Ignition source thermocouples consisting of 4-18 gauge ceramic shielded type K thermocouples placed in a 0.5 inch diameter stainless pipe are utilized in the test. The thermocouple tip is projected 1 inch from the end of the insulation and 3 inches beyond the end of the pipe. The thermocouple assemblies are fixed to a metal support and pre-set to the required elevations as noted below. Thermocouple locations are also shown in FIG. 1.

Thermocouple Locations (see FIG. 1):
Thermocouple 1—1 inch below the ceiling of the test room and 4 feet from each side wall and the back wall;
Thermocouple 2—60 inches below the ceiling of the test room and 3 inches from each wall of the back left corner;
Thermocouple 3—36 inches below the ceiling of the test room and 3 inches from each wall of the back left corner;
Thermocouple 4—12 inches below the ceiling of the test room and 3 inches from each wall of the back left corner;
Thermocouple 5—1 inch below the ceiling of the test room and 3 inches from each wall of the back left corner;
Thermocouple 6—1 inch below the ceiling of the test room and 4 feet from the back wall and 3 inches from the left side wall;
Thermocouple 7—36 inches below the ceiling of the test room and 4 feet from the back wall and 3 inches from the left side wall;
Thermocouple 8—1 inch below the ceiling of the test room and 8 feet from the back wall (sample wall) and 3 inches from the left side wall;
Thermocouple 9—center of the doorway and 1 inch below the top of the doorway opening and
Thermocouple 10—not utilized.

In light of the results obtained from the above UL-1715 Test, the panels coated with a polyurethane foam in accordance with one embodiment of the present invention possess superior fire-retardant properties. This is because: (i) observed surface burning does not extend to the extremities of any of the test specimen panels; (ii) flames do not project through the door of the test room at any time during the length of the test (15 minutes after ignition); and (iii) at the conclusion of the test observations show that the burning on any and all test specimens diminishes with increasing distance from the ignition source. Given this, the polyurethane foam composition of the present invention is successful in meeting the acceptance criteria of test method UL-1715 (Fire Tests of Interior Finish Material).

Room Fire Test 3:

Next the formulation of Table 2 is sprayed to produce a polyurethane foam composition and the resulting foam is spray-applied to a nominal thickness of about 2 inches to two pieces of gypsum wall board (0.375 inches by 4 foot by 8 foot). These two pieces of wallboard are then assembled into the back 8 foot by 8 foot ceiling section of the test room as described below. The test room is designed in accordance with Test Method UL-1715. The complete room, excluding the 8 foot by 8 foot ceiling area where the test specimens are installed, is constructed from cement board by affixing the necessary pieces, including those with the inventive foam of the present invention mounted thereon, to 20 gauge steel studs. The panels are fastened to the steel studs described above with 0.25 inch by 6 inch carriage bolts with 1" washers, three per panel, spaced according to the above-mentioned Test Method UL-1715. The test room is then permitted to condition at a temperature of 73° F. (±4° F.) and 50% relative humidity (±5%).

Regarding the construction of the test room, as is noted above, 20 gauge galvanized steel studs measuring 3.625 inches by 8 feet are spaced 24 inches apart, on center, for the walls and 16 inches apart, on center, for the ceiling. The room has four walls with the north and south walls being 8 feet wide (±0.5 inch) and the east and west walls are 12 feet long (±0.5 inch). All walls are 8 feet tall and the north wall has an opening 2.5 feet wide by 7 feet tall located in the center thereof and opposite the south wall.

Next, a wood crib composed of 50 sticks measuring 2 inches by 2 inches by 15 inches in 10 alternating tiers is constructed from spruce/pine/fir lumber. Each subsequent layer is secured to the layer below with one 8d common nail into each end of each stick. The completed crib is conditioned at 120° F. (±10° F.) and 20% relative humidity (±5%). Additionally, the crib is adjusted to a weight of 30 pounds (±1 pound). The crib is then located as is illustrated by FIG. 1 in the back left corner of the room (represented by the small square having an X contained therein). One pound of shredded, fluffed wood excelsior is placed around the base of the crib. The crib is then placed in the location shown in FIG. 1 and is located 3 inches from the adjacent walls. The excelsior is soaked with 4 ounces of ethyl alcohol except for a 6 inch by 6 inch portion area diametrically opposite the wall intersection. Test time commences upon ignition of the excelsior. Test room conditions are 66° F. and 38% relative humidity at the start of the test.

Ignition source thermocouples consisting of 4-18 gauge ceramic shielded type K thermocouples placed in a 0.5 inch diameter stainless pipe are utilized in the test. The thermocouple tip is projected 1 inch from the end of the insulation and 3 inches beyond the end of the pipe. The thermocouple assemblies are fixed to a metal support and pre-set to the required elevations as noted below. Thermocouple locations are also shown in FIG. 1.

Thermocouple Locations (see FIG. 1):

Thermocouple 1—1 inch below the ceiling of the test room and 4 feet from each side wall and the back wall;

Thermocouple 2—60 inches below the ceiling of the test room and 3 inches from each wall of the back left corner;

Thermocouple 3—36 inches below the ceiling of the test room and 3 inches from each wall of the back left corner;

Thermocouple 4—12 inches below the ceiling of the test room and 3 inches from each wall of the back left corner;

Thermocouple 5—1 inch below the ceiling of the test room and 3 inches from each wall of the back left corner;

Thermocouple 6—1 inch below the ceiling of the test room and 4 feet from the back wall and 3 inches from the left side wall;

Thermocouple 7—36 inches below the ceiling of the test room and 4 feet from the back wall and 3 inches from the left side wall; Thermocouple 8—1 inch below the ceiling of the test room and 8 feet from the back wall (sample wall) and 3 inches from the left side wall;

Thermocouple 9—center of the doorway and 1 inch below the top of the doorway opening; and Thermocouple 10—not utilized.

In light of the results obtained from the above UL-1715 Test, the panels coated with a polyurethane foam in accordance with one embodiment of the present invention possess superior fire-retardant properties. This is because: (i) observed surface burning does not extend to the extremities of any of the test specimen panels; (ii) flames do not project through the door of the test room at any time during the length of the test (15 minutes after ignition); and (iii) at the conclusion of the test observations show that the burning on any and all test specimens diminishes with increasing distance from the ignition source. Given this, the polyurethane foam composition of the present invention is successful in meeting the acceptance criteria of test method UL-1715 (Fire Tests of Interior Finish Material).

Room Fire Test 4:

Next the formulation of Table 2 is sprayed to produce a polyurethane foam composition and the resulting foam is spray-applied to a nominal thickness of about 4 inches to four pieces of gypsum wall board (0.375 inches by 4 foot by 8 foot). These four pieces of wallboard are then assembled into the back 8 foot by 8 foot wall and the 8 foot by 8 foot portion of the left wall of the test room extending from the back wall towards the front wall with the door (see FIG. 1) as described below. The test room is designed in accordance with Test Method UL-1715. The complete room, including the ceiling, is constructed from cement board by affixing the necessary pieces, including those with the inventive foam of the present invention mounted thereon, to 20 gauge steel studs. The panels are fastened to the steel studs described above with 0.25 inch by 6 inch carriage bolts with 1" washers, three per panel, spaced according to the above-mentioned Test Method UL-1715. The joint of the corner were the test panels meet is left untreated. The test room is then permitted to condition at a temperature of 73° F. (±4° F.) and 50% relative humidity (±5%).

Regarding the construction of the test room, as is noted above, 20 gauge galvanized steel studs measuring 3.625 inches by 8 feet are spaced 24 inches apart, on center, for the walls and 16 inches apart, on center, for the ceiling. The room has four walls with the north and south walls being 8 feet wide (±0.5 inch) and the east and west walls are 12 feet long (±0.5 inch). All walls are 8 feet tall and the north wall has an opening 2.5 feet wide by 7 feet tall located in the center thereof and opposite the south wall.

Next, a wood crib composed of 50 sticks measuring 2 inches by 2 inches by 15 inches in 10 alternating tiers is constructed from spruce/pine/fir lumber. Each subsequent layer is secured to the layer below with one 8d common nail into each end of each stick. The completed crib is conditioned at 120° F. (±10° F.) and 20% relative humidity (±5%). Additionally, the crib is adjusted to a weight of 30 pounds (±1 pound). The crib is then located as is illustrated by FIG. 1 in the back left corner of the room (represented by the small square having an X contained therein). One pound of shredded, fluffed wood excelsior is placed around the base of the crib. The crib is then placed in the location shown in FIG. 1 and is located 3 inches from the adjacent walls. The excelsior is soaked with 4 ounces of ethyl alcohol except for a 6 inch by 6 inch portion area diametrically opposite the wall intersection. Test time commences upon ignition of the excelsior. Test room conditions are 66° F. and 38% relative humidity at the start of the test.

Ignition source thermocouples consisting of 4-18 gauge ceramic shielded type K thermocouples placed in a 0.5 inch diameter stainless pipe are utilized in the test. The thermocouple tip is projected 1 inch from the end of the insulation and 3 inches beyond the end of the pipe. The thermocouple assemblies are fixed to a metal support and pre-set to the required elevations as noted below. Thermocouple locations are also shown in FIG. 1.

Thermocouple Locations (see FIG. 1):

Thermocouple 1—1 inch below the ceiling of the test room and 4 feet from each side wall and the back wall;

Thermocouple 2—60 inches below the ceiling of the test room and 3 inches from each wall of the back left corner;

Thermocouple 3—36 inches below the ceiling of the test room and 3 inches from each wall of the back left corner;

Thermocouple 4—12 inches below the ceiling of the test room and 3 inches from each wall of the back left corner;

Thermocouple 5—1 inch below the ceiling of the test room and 3 inches from each wall of the back left corner;

Thermocouple 6—1 inch below the ceiling of the test room and 4 feet from the back wall and 3 inches from the left side wall;

Thermocouple 7—36 inches below the ceiling of the test room and 4 feet from the back wall and 3 inches from the left side wall;

Thermocouple 8—1 inch below the ceiling of the test room and 8 feet from the back wall (sample wall) and 3 inches from the left side wall;

Thermocouple 9—center of the doorway and 1 inch below the top of the doorway opening; and Thermocouple 10—not utilized.

In light of the results obtained from the above UL-1715 Test, the panels coated with a polyurethane foam in accordance with one embodiment of the present invention possess superior fire-retardant properties. This is because: (i) observed surface does not extend to the extremities of any of the test specimen panels; (ii) flames do not project through the door of the test room at any time during the length of the test (15 minutes after ignition); and (iii) at the conclusion of the test observations show that the burning on any and all test specimens diminishes with increasing distance from the ignition source. Given this, the polyurethane foam composition of the present invention is successful in meeting the acceptance criteria of test method UL-1715 (Fire Tests of Interior Finish Material).

Room Fire Test 5:

Next the formulation of Table 2 is sprayed to produce a polyurethane foam composition and the resulting foam is spray-applied to a nominal thickness of about 8 inches to two pieces of gypsum wall board (0.375 inches by 4 foot by 8 foot). These two pieces of wallboard are then assembled into the back 8 foot by 8 foot ceiling section of the test room as described below. The test room is designed in accordance with Test Method UL-1715. The complete room, excluding the 8 foot by 8 foot ceiling area where the test specimens are installed, is constructed from cement board by affixing the necessary pieces, including those with the inventive foam of the present invention mounted thereon, to 20 gauge steel studs. The panels are fastened to the steel studs described above with 0.25 inch by 6 inch carriage bolts with 1" washers, three per panel, spaced according to the above-mentioned Test Method UL-1715. The test room is then permitted to condition at a temperature of 73° F. (±4° F.) and 50% relative humidity (±5%).

Regarding the construction of the test room, as is noted above, 20 gauge galvanized steel studs measuring 3.625 inches by 8 feet are spaced 24 inches apart, on center, for the walls and 16 inches apart, on center, for the ceiling. The room has four walls with the north and south walls being 8 feet wide (±0.5 inch) and the east and west walls are 12 feet long (±0.5 inch). All walls are 8 feet tall and the north wall has an opening 2.5 feet wide by 7 feet tall located in the center thereof and opposite the south wall.

Next, a wood crib composed of 50 sticks measuring 2 inches by 2 inches by 15 inches in 10 alternating tiers is constructed from spruce/pine/fir lumber. Each subsequent layer is secured to the layer below with one 8d common nail into each end of each stick. The completed crib is conditioned at 120° F. (±10° F.) and 20% relative humidity (±5%). Additionally, the crib is adjusted to a weight of 30 pounds (±1 pound). The crib is then located as is illustrated by FIG. 1 in the back left corner of the room (represented by the small square having an X contained therein). One pound of shredded, fluffed wood excelsior is placed around the base of the crib. The crib is then placed in the location shown in FIG. 1 and is located 3 inches from the adjacent walls. The excelsior is soaked with 4 ounces of ethyl alcohol except for a 6 inch by 6 inch portion area diametrically opposite the wall intersection. Test time commences upon ignition of the excelsior. Test room conditions are 66° F. and 38% relative humidity at the start of the test.

Ignition source thermocouples consisting of 4-18 gauge ceramic shielded type K thermocouples placed in a 0.5 inch diameter stainless pipe are utilized in the test. The thermocouple tip is projected 1 inch from the end of the insulation and 3 inches beyond the end of the pipe. The thermocouple assemblies are fixed to a metal support and pre-set to the required elevations as noted below. Thermocouple locations are also shown in FIG. 1.

Thermocouple Locations (see FIG. 1):

Thermocouple 1—1 inch below the ceiling of the test room and 4 feet from each side wall and the back wall;

Thermocouple 2—60 inches below the ceiling of the test room and 3 inches from each wall of the back left corner;

Thermocouple 3—36 inches below the ceiling of the test room and 3 inches from each wall of the back left corner;

Thermocouple 4—12 inches below the ceiling of the test room and 3 inches from each wall of the back left corner;

Thermocouple 5—1 inch below the ceiling of the test room and 3 inches from each wall of the back left corner;

Thermocouple 6—1 inch below the ceiling of the test room and 4 feet from the back wall and 3 inches from the left side wall;

Thermocouple 7—36 inches below the ceiling of the test room and 4 feet from the back wall and 3 inches from the left side wall;

Thermocouple 8—1 inch below the ceiling of the test room and 8 feet from the back wall (sample wall) and 3 inches from the left side wall;

Thermocouple 9—center of the doorway and 1 inch below the top of the doorway opening; and Thermocouple 10—not utilized.

In light of the results obtained from the above UL-1715 Test, the panels coated with a polyurethane foam in accordance with one embodiment of the present invention possess superior fire-retardant properties. This is because: (i) observed surface does not extend to the extremities of any of the test specimen panels; (ii) flames do not project through the door of the test room at any time during the length of the test (15 minutes after ignition); and (iii) at the conclusion of the test observations show that the burning on any and all test specimens diminishes with increasing distance from the ignition source. Given this, the polyurethane foam composition of the present invention is successful in meeting the acceptance criteria of test method UL-1715 (Fire Tests of Interior Finish Material).

Flame Spread and Smoke Test:

A flame spread and smoke test (ASTM E-84) is conducted on foam produced from the formulation of Table 2. This formulation is sprayed on nine pieces of quarter inch thick cement board that is 22 inches wide by 8 feet long and 4 inches in thickness. Three pieces from the nine pieces so produced are butted together to form a test specimen that is approximately 20 inches wide and 24 feet long. This is repeated twice more with the remaining six pieces to yield three overall test specimens Each test specimen is then subjected to flame spread and smoke test ASTM E-84.

Test Specimen 1—ignition occurs in 4 seconds, the flame front is 5 feet, the time to maximum spread is 35 seconds, the test duration is 10 minutes, and the flame spread rating is determined to be 25 and the smoke development rating 300.

Test Specimen 2—ignition occurs in 4 seconds, the flame front is 5 feet, the time to maximum spread is 31 seconds, the test duration is 10 minutes, and the flame spread rating is determined to be 25 and the smoke development rating 300.

Test Specimen 3—ignition occurs in 3 seconds, the flame front is 5 feet, the time to maximum spread is 18 seconds, the test duration is 10 minutes, and the flame spread rating is determined to be 25 and the smoke development rating 350.

In light of the above, the average flame spread rating of the foam formulation of Table 2 is determined to be 25 and the smoke development rating 300.

In light of the above, the present invention is advantageous in that it permits one to produce various polyurethane foam compositions that possess desirable fire-resistant and/or fire-retardant properties. Due to such desirable fire-resistant and/or fire-retardant properties the polyurethane foam compositions of the present invention can be utilized in various applications that were to date not possible. For example, in one embodiment, the polyurethane foams of the present invention are able to be utilized without additional fire-resistant coatings, fire-resistant construction finishing products and/or fire-control barriers and still are able to pass various building codes and/or standardized fire tests as described above.

In still another embodiment, the present invention is advantageous in that it makes possible the substitution and/or elimination of various standard, non-intumescent fire-retardants with the one or more intumescent compounds of the present invention while still permitting the resulting polyurethane foams of the present invention to pass one or more building codes and/or standardized fire tests including, but not limited to, UL-1715, NFPA 286, ISO 9705, FM 4880, UL-1040, ASTM E-119, NFPA 215, UL-263, NFPA 285, UL-1256, ASTM E-108, UL-790, ASTM E-84, UL-723, and/or NFPA 255.

In still another embodiment, the polyurethane foams of the present invention have a fractional and/or hourly rating of at least about 20 minutes, at least about 30 minutes, at least about 45 minutes, at least about 60 minutes, at least about 90 minutes, at least about 120 minutes, or even at least about 180 minutes as determined by ASTM E-119, NFPA 251 and/or UL 263. Here, as well as elsewhere in the specification and claims, individual range limits can be combined to form additional and/or non-disclosed ranges.

In still another embodiment, it should be realized that although the polyurethane foams of the present invention do not require one or more additional coatings and/or construction finishing products in order to pass various building codes and/or standardized fire tests as described above, such coatings can still be used if so desired. Additionally, the polyurethane foams of the present invention are unique and advantageous in that the polyurethane foams of the present invention permit the use of a wide variety of coatings and/or construction finishing products for non-fire retardancy related purposes while still retaining the ability to pass various building codes and/or standardized fire tests as described above.

Although the invention has been shown and described with respect to certain embodiments, it is obvious that equivalent alterations and modifications will occur to others skilled in the art upon the reading and understanding of this specification. In particular with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A sprayed polyurethane foam formed from a combination comprising:
    (a) at least one isocyanate component, wherein the at least one isocyanate component comprises:
        (i) at least one intumescent compound;
        (ii) at least one isocyanate compound; and
        (iii) at least one anti-settling compound,
    (b) at least one polyol component, wherein the at least one polyol component comprises:
        (i) at least one intumescent compound;
        (ii) at least one polyol compound; and
        (iii) at least one anti-settling compound, and
    wherein components (a) and (b) are sprayed at a ratio of about one to one by volume to yield a sprayed polyurethane foam composition,
    wherein the at least one intumescent compound is a particle-based expandable graphite compound where at least 90.55 percent by weight of the particles of the expandable graphite compound have a particle size in the range of 250 microns to 500 microns, and
    wherein the sprayed polyurethane foam contains between about 7.5 percent by weight to 12.5 percent by weight of the particle-based expandable graphite compound and passes a fire test selected from UL 1715.

2. The sprayed polyurethane foam of claim 1, wherein the sprayed polyurethane foam composition has a Class A flame-spread rating of less than about 25 as defined by the standards set forth in either ASTM E-84, UL-723 or NFPA 255.

3. The sprayed polyurethane foam of claim 1, wherein the sprayed polyurethane foam composition has a smoke development rating of less than about 450 as defined by the standards set forth in either ASTM E-84, UL-723 or NFPA 255.

4. The sprayed polyurethane foam of claim 1, wherein the at least one particle-based expandable graphite compound of the at least one isocyanate component is selected from treated expandable graphite, or a combination of expandable graphite and treated expandable graphite.

5. The sprayed polyurethane foam of claim 1, wherein the at least one particle-based expandable graphite compound of the at least one polyol component is selected from treated expandable graphite, or a combination of expandable graphite and treated expandable graphite.

6. The sprayed polyurethane foam of claim 1, wherein the at least one isocyanate component further comprises one or more fire retardant compounds selected from halogen and/or phosphorous-containing fire-retardant compounds, one or more antimony oxides, one or more boron-containing fire-retardant compounds, one or more hydrated aluminas, one or more polyammonium phosphates, one or more halogenated fire-retardant compounds, one or more melamine-based fire retardants or a mixture of any two or more thereof.

7. The sprayed polyurethane foam of claim 1, wherein the at least one polyol component further comprises one or more fire retardant compounds selected from halogen and/or phosphorous-containing fire-retardant compounds, one or more antimony oxides, one or more boron-containing fire-retardant compounds, one or more hydrated aluminas, one or more polyammonium phosphates, one or more halogenated fire-retardant compounds, one or more melamine-based fire retardants or a mixture of any two or more thereof.

8. The sprayed polyurethane foam of claim 1, wherein the at least one isocyanate component further comprises one or more colorants, one or more viscosity modifiers, one or more pigments, or mixtures of any two or more thereof.

9. The sprayed polyurethane foam of claim 1, wherein the at least one polyol component further comprises one or more colorants, one or more viscosity modifiers, one or more pigments, or mixtures of any two or more thereof.

10. The sprayed polyurethane foam of claim 1, wherein the sprayed polyurethane foam has a density in the range of about 0.25 pounds per cubic foot to about 6 pounds per cubic foot.

11. A sprayed polyurethane foam formed from a combination comprising:
(A) at least one isocyanate component, wherein the at least one isocyanate component comprises at least one isocyanate compound;
(B) at least one polyol component, wherein the at least one polyol component comprises at least one polyol compound; and
(C) at least one low-boiling hydrocarbon blowing agent, wherein either one, or both, of components (A) and (B) further comprise at least one intumescent compound and at least one anti-settling compound, wherein the combination of the at least one low-boiling hydrocarbon blowing agent and components (A) and (B) are sprayed at a ratio of about one to one by volume to yield a sprayed polyurethane foam composition,
wherein the at least one intumescent compound is a particle-based expandable graphite compound where at least 90.55 percent by weight of the particles of the expandable graphite compound have a particle size in the range of 250 microns to 500 microns, and
wherein the sprayed polyurethane foam contains between about 7.5 percent by weight to 12.5 percent by weight of the particle-based expandable graphite compound and passes a fire test selected from UL 1715.

12. The sprayed polyurethane foam of claim 11, wherein the sprayed polyurethane foam composition has a Class A flame-spread rating of less than about 25 as defined by the standards set forth in either ASTM E-84, UL-723 or NFPA 255.

13. The sprayed polyurethane foam of claim 11, wherein the sprayed polyurethane foam composition has a smoke development rating of less than about 450 as defined by the standards set forth in either ASTM E-84, UL-723 or NFPA 255.

14. The sprayed polyurethane foam of claim 11, wherein the at least one particle-based expandable graphite compound of the at least one isocyanate component is selected from treated expandable graphite, or a combination of expandable graphite and treated expandable graphite.

15. The sprayed polyurethane foam of claim 11, wherein the at least one particle-based expandable graphite compound of the at least one polyol component is selected from treated expandable graphite, or a combination of expandable graphite and treated expandable graphite.

16. The sprayed polyurethane foam of claim 11, wherein at least one isocyanate component further comprises one or more fire retardant compounds selected from halogen and/or phosphorous-containing fire-retardant compounds, one or more antimony oxides, one or more boron-containing fire-retardant compounds, one or more hydrated aluminas, one or more polyammonium phosphates, one or more halogenated fire-retardant compounds, one or more melamine-based fire retardants or a mixture of any two or more thereof.

17. The sprayed polyurethane foam of claim 11, wherein at least one polyol component further comprises one or more fire retardant compounds selected from halogen and/or phosphorous-containing fire-retardant compounds, one or more antimony oxides, one or more boron-containing fire-retardant compounds, one or more hydrated aluminas, one or more polyammonium phosphates, one or more halogenated fire-retardant compounds, one or more melamine-based fire retardants or a mixture of any two or more thereof.

18. The sprayed polyurethane foam of claim 11, wherein the at least one isocyanate component further comprises one or more colorants, one or more viscosity modifiers, one or more pigments, or mixtures of any two or more thereof.

19. The sprayed polyurethane foam of claim 11, wherein the at least one polyol component further comprises one or more colorants, one or more viscosity modifiers, one or more pigments, or mixtures of any two or more thereof.

20. The sprayed polyurethane foam of claim 11, wherein the sprayed polyurethane foam has a density in the range of about 0.25 pounds per cubic foot to about 6 pounds per cubic foot.

21. A sprayed polyurethane foam comprising:
(I) from about 1 percent by weight to about 50 percent by weight of one or more intumescent compounds based on the total amount of polyurethane present;
(II) from about 0.001 percent by weight to about 10 percent by weight of one or more viscosity modifiers based on the total amount of polyurethane present;
(III) from about 0.01 percent by weight to about 20 percent by weight of one or more thixotropic agents based on the total amount of polyurethane present; and
(IV) from about 1 percent by weight to about 25 percent by weight of one or more colorants and/or pigments based on the total amount of polyurethane present, wherein the sprayed polyurethane foam is the product of a one to one by volume sprayed mixture of an isocyanate component and a polyol component, wherein the at least one intumescent compound is a particle-based expandable graphite compound where at least 90.55 percent by weight of the particles of the expandable graphite compound have a particle size in the range of 250 microns to 500 microns, and
wherein the sprayed polyurethane foam contains between about 7.5 percent by weight to 12.5 percent by weight of the particle-based expandable graphite compound and passes a fire test selected from UL 1715.

22. The sprayed polyurethane foam of claim 21, wherein the sprayed polyurethane foam composition has a Class A flame-spread rating of less than about 25 as defined by the standards set forth in either ASTM E-84, UL-723 or NFPA 255.

23. The sprayed polyurethane foam of claim 21, wherein the sprayed polyurethane foam composition has a smoke development rating of less than about 450 as defined by the standards set forth in either ASTM E-84, UL-723 or NFPA 255.

24. The sprayed polyurethane foam of claim 21, wherein at least one isocyanate component further comprises one or more fire retardant compounds selected from halogen and/or phosphorous-containing fire-retardant compounds, one or more antimony oxides, one or more boron-containing fire-retardant compounds, one or more hydrated aluminas, one or more polyammonium phosphates, one or more halogenated fire-retardant compounds, one or more melamine-based fire retardants or a mixture of any two or more thereof.

25. The sprayed polyurethane foam of claim 21, wherein at least one of the at least one polyol component further comprises one or more fire retardant compounds selected from halogen and/or phosphorous-containing fire-retardant compounds, one or more antimony oxides, one or more boron-containing fire-retardant compounds, one or more hydrated aluminas, one or more polyammonium phosphates, one or more halogenated fire-retardant compounds, one or more melamine-based fire retardants or a mixture of any two or more thereof.

26. The sprayed polyurethane foam of claim 21, wherein the sprayed polyurethane foam has a density in the range of about 0.25 pounds per cubic foot to about 6 pounds per cubic foot.

27. The sprayed polyurethane foam of claim 21, wherein the sprayed polyurethane foam comprises about 0.01 percent by weight to about 7.5 percent by weight of one or more viscosity modifiers based on the total amount of polyurethane present.

28. The sprayed polyurethane foam of claim 21, wherein the sprayed polyurethane foam comprises about 0.1 percent by weight to about 15 percent by weight of one or more thixotropic agents based on the total amount of polyurethane present.

29. The sprayed polyurethane foam of claim 21, wherein the sprayed polyurethane foam comprises about 2.5 percent by weight to about 22.5 percent by weight of one or more colorants and/or pigments based on the total amount of polyurethane present.

30. A method for producing a sprayed polyurethane foam, the method comprising the steps of:
    providing at least one isocyanate component, wherein the at least one isocyanate component comprises at least one isocyanate compound, at least one intumescent compound, and at least one anti-settling compound;
    providing at least one polyol component, wherein the at least one polyol component comprises at least one polyol compound, at least one intumescent compound, and at least one anti-settling compound; and
    mixing the at least one isocyanate component with the at least one polyol component at a ratio of about one to one by volume via a spray mixing device to produce a sprayed polyurethane foam,
    wherein the at least one intumescent compound is a particle-based expandable graphite compound where at least 90.55 percent by weight of the particles of the expandable graphite compound have a particle size in the range of 250 microns to 500 microns, and
    wherein the sprayed polyurethane foam contains between about 7.5 percent by weight to 12.5 percent by weight of the particle-based expandable graphite compound and passes a fire test selected from UL 1715.

31. The method of claim 30, wherein the sprayed polyurethane foam composition has a Class A flame-spread rating of less than about 25 as defined by the standards set forth in either ASTM E-84, UL-723 or NFPA 255.

32. The method of claim 30, wherein the sprayed polyurethane foam composition has a smoke development rating of less than about 450 as defined by the standards set forth in either ASTM E-84, UL-723 or NFPA 255.

33. The method of claim 30, wherein the at least one particle-based expandable graphite compound is selected from treated expandable graphite, or a combination of expandable graphite and treated expandable graphite.

34. The method of claim 30, wherein the sprayed polyurethane foam further comprises one or more fire retardant compounds selected from halogen and/or phosphorous-containing fire-retardant compounds, one or more antimony oxides, one or more boron-containing fire-retardant compounds, one or more hydrated aluminas, one or more polyammonium phosphates, one or more halogenated fire-retardant compounds, one or more melamine-based fire retardants or a mixture of any two or more thereof.

35. The method of claim 30, wherein the sprayed polyurethane foam further comprises one or more colorants, one or more viscosity modifiers, one or more pigments, or mixtures of any two or more thereof.

36. The method of claim 30, wherein the sprayed polyurethane foam has a density in the range of about 0.25 pounds per cubic foot to about 6 pounds per cubic foot.

37. The sprayed polyurethane foam of claim 1, wherein the sprayed polyurethane foam further passes any one or more fire tests selected from FM 4880, UL-1040, NFPA 285, UL-1256, ASTM E-108 or UL-790, or has a fractional and/or hourly rating of at least about 20 minutes as determined by ASTM E-119, NFPA 251 or UL 263.

38. The sprayed polyurethane foam of claim 11, wherein the sprayed polyurethane foam further passes any one or more fire tests selected from FM 4880, UL-1040, NFPA 285, UL-1256, ASTM E-108 or UL-790, or has a fractional and/or hourly rating of at least about 20 minutes as determined by ASTM E-119, NFPA 251 or UL 263.

39. The sprayed polyurethane foam of claim 21, wherein the sprayed polyurethane foam further passes any one or more fire tests selected from FM 4880, UL-1040, NFPA 285, UL-1256, ASTM E-108 or UL-790, or has a fractional and/or hourly rating of at least about 20 minutes as determined by ASTM E-119, NFPA 251 or UL 263.

40. The method of claim 30, wherein the sprayed polyurethane foam further passes any one or more fire tests selected from FM 4880, UL-1040, NFPA 285, UL-1256, ASTM E-108 or UL-790, or has a fractional and/or hourly rating of at least about 20 minutes as determined by ASTM E-119, NFPA 251 or UL 263.

41. A sprayed polyurethane foam formed from a combination consisting essentially of:
    (a) at least one isocyanate component, wherein the at least one isocyanate component comprises:
        (i) at least one intumescent compound;
        (ii) at least one isocyanate compound; and
        (iii) at least one anti-settling compound,
    (b) at least one polyol component, wherein the at least one polyol component comprises:
        (i) at least one intumescent compound;
        (ii) at least one polyol compound; and
        (iii) at least one anti-settling compound, and
    wherein components (a) and (b) are sprayed at a ratio of about one to one by volume to yield a sprayed polyurethane foam composition,
    wherein the at least one intumescent compound is a particle-based expandable graphite compound and at least 91.18 percent by weight of the particles of the expandable graphite compound have a particle size in the range of 250 microns to 500 microns, and
    wherein the sprayed polyurethane foam contains between about 7.5 percent by weight to 12.5 percent by weight of the particle-based expandable graphite compound and passes a fire test selected from UL 1715 due to both the amount and particle size distribution of the particle-based expandable graphite compound in the final foam composition.

* * * * *